United States Patent
Hu et al.

(10) Patent No.: US 8,923,447 B2
(45) Date of Patent: Dec. 30, 2014

(54) CHANNEL ESTIMATION METHOD AND SYSTEM BASED ON TIME-DOMAIN TRAINING SEQUENCE

(75) Inventors: Gang Hu, Shanghai (CN); Yuanfei Nie, Shanghai (CN); Meiwu Wu, Shanghai (CN)

(73) Assignee: Montage Technology (Shanghai) Co., Ltd., Shanghai (CN)

( * ) Notice: Subject to any disclaimer, the term of this patent is extended or adjusted under 35 U.S.C. 154(b) by 18 days.

(21) Appl. No.: 13/813,189

(22) PCT Filed: Mar. 22, 2011

(86) PCT No.: PCT/CN2011/072030
§ 371 (c)(1),
(2), (4) Date: Jan. 30, 2013

(87) PCT Pub. No.: WO2012/113168
PCT Pub. Date: Aug. 30, 2012

(65) Prior Publication Data
US 2013/0129023 A1 May 23, 2013

(30) Foreign Application Priority Data

Feb. 25, 2011 (CN) .......................... 2011 1 0045180

(51) Int. Cl.
*H04L 27/06* (2006.01)
*H04L 25/02* (2006.01)
*H04L 25/03* (2006.01)

(52) U.S. Cl.
CPC ........ *H04L 25/0242* (2013.01); *H04L 25/0226* (2013.01); *H04L 25/0212* (2013.01); *H04L 25/03299* (2013.01)
USPC ........... 375/340; 375/316; 375/322; 375/341; 375/345; 375/350

(58) Field of Classification Search
CPC ............ H04L 25/0242; H04L 25/0212; H04L 25/0226; H04L 25/03299; H04B 1/7093; H04B 1/7103; H04B 2201/70701
USPC ......... 375/229, 259, 262, 272, 295, 297, 316, 375/320, 322, 330, 332, 340, 341, 342, 344, 375/345, 350

See application file for complete search history.

(56) References Cited

U.S. PATENT DOCUMENTS 6,647,078 B1 * 11/2003 Thomas et al. ............... 375/349
7,035,353 B2 * 4/2006 Fimoff et al. ................. 375/340

(Continued)

FOREIGN PATENT DOCUMENTS

| CN | 1346187 A | 4/2002 |
| CN | 101964764 A | 2/2011 |

(Continued)

OTHER PUBLICATIONS

Yeh et al., "OFDM System Channel Estimation Using Time-Domain Training Sequence for Mobile Reception of Digital Terrestrial Broadcasting," *IEEE Transactions on Broadcasting*, Sep. 2000, pp. 215-220, vol. 46, No. 3.

(Continued)

*Primary Examiner* — Hirdepal Singh
(74) *Attorney, Agent, or Firm* — Oliff PLC

(57) ABSTRACT

A channel estimation method and a channel estimation system based on time-domain training sequence are provided. The channel estimation system first acquires an initial channel vector used for channel estimation of a current frame, and calculates an algorithm initial vector based on a training sequence vector contained in a received receiving signal vector and the receiving signal vector, then performs estimation based on the initial channel vector and the algorithm initial vector and using a conjugate gradient method based on a preprocessing matrix to acquire each channel estimation value, and eventually perform noise reduction processing on each channel estimation value based on a first predetermined threshold value to acquire a final channel estimation value. Compared with the existing channel estimation methods, the present invention has a shorter delay and lower calculation complexity, and thus can be easily implemented.

26 Claims, 7 Drawing Sheets

(56) References Cited

U.S. PATENT DOCUMENTS

| | | | |
|---|---|---|---|
| 7,203,257 B2 | 4/2007 | Fimoff et al. | |
| 7,327,810 B2 * | 2/2008 | Kim et al. | 375/340 |
| 7,394,873 B2 * | 7/2008 | Maltsev et al. | 375/324 |
| 8,300,742 B1 * | 10/2012 | Bromberg et al. | 375/346 |
| 8,488,712 B2 * | 7/2013 | Bjerke et al. | 375/267 |
| 2005/0123074 A1 * | 6/2005 | Kim et al. | 375/340 |
| 2005/0276338 A1 * | 12/2005 | Chow et al. | 375/260 |
| 2006/0023799 A1 * | 2/2006 | Kang et al. | 375/260 |
| 2006/0182168 A1 * | 8/2006 | Wang et al. | 375/143 |
| 2010/0008433 A1 * | 1/2010 | Huang et al. | 375/260 |
| 2013/0121392 A1 * | 5/2013 | Thompson et al. | 375/227 |

FOREIGN PATENT DOCUMENTS

| | | |
|---|---|---|
| WO | WO 2007/029142 A2 | 3/2007 |
| WO | WO 2008/038884 A1 | 4/2008 |

OTHER PUBLICATIONS

Chen et al., "Channel Estimation Technique with Assistance of PN-Coded Training Sequences for Wireless OFDM Communications," *IWCMC'07*, Aug. 12-16, 2007, pp. 109-114, Honolulu, Hawaii.

Tchamkerten et al., "On the Use of Training Sequences for Channel Estimation," *IEEE Transactions on Information Theory*, Mar. 2006, pp. 1171-1176, vol. 52, No. 3.

International Search Report issued in International Patent Application No. PCT/CN2011/072030 dated Dec. 8, 2011.

* cited by examiner

CHANNEL ESTIMATION METHOD AND SYSTEM BASED ON TIME-DOMAIN TRAINING SEQUENCE

BACKGROUND OF THE PRESENT INVENTION

1. Field of Invention

The present invention relates to the field of digital video broadcasting, and more particularly to a channel estimation method and system based on a time-domain training sequence.

2. Description of Related Arts

The broadcast channel has the characteristics as follows: 1) the delay is long, and is up to hundreds of symbol rate intervals; 2) in a single orthogonal frequency-division multiplexing (OFDM) block, the channel response does not change or changes slightly; and 3) various additive interferences exist extensively. Therefore, the researchers focus on how to estimate a channel accurately to decode data.

The existing channel estimation method mainly includes:

1. Che-Shen Yeh, et. al have proposed an estimation method based on a training sequence in the document "Che-Shen Yeh, Yinyi Lin, and Yiyan Wu, OFDM System Channel Estimation Using Time-Domain Training Sequence for Mobile Reception of Digital Terrestrial Broadcasting, IEEE TRANSACTIONS ON BROADCASTING, VOL. 46, NO. 3, SEPTEMBER 2000".

2. Yan-Chang Chen, et. al have in the document "Yan-Chang Chen, Wen-Jeng Lin, Jung-Shan Lin, Channel Estimation Technique with Assistance of PN-Coded Training Sequences for Wireless OFDM Communications, IWCMC'07" have analyzed the performance of channel estimation by using the least-square (LS), simplified LS (SLS), the hybrid LS (HLS), and maximum likelihood (ML).

3. Lei Zhou, et. al have proposed a channel estimation method based on a known delay in the PRC Patent Document with the Publication No. CN 1346187A, in which a conjugate gradient algorithm is used to estimate a channel response of a code division multiple access (CDMA) system at a known channel location to eliminate the data interferences.

4. Jin H. Kim, et. al have proposed a series of channel estimation methods for the Advanced Television Systems Committee (ATSC) in the US Patent Document with the Application No. 729722 and the theme "Efficient conjugate gradient based channel estimator", in which the information of the decoding feedback is particularly used as a training sequence and the minimum mean square error (MMSE) criterion is used to acquire the channel estimation. To simplify the implementation, the FFT is further used to perform the conjugate gradient update.

5. Mark, Fimoff, et. al have proposed a channel estimation method combining correlation and least-square in the U.S. Pat. No. 7,035,353 and U.S. Pat. No. 7,203,257, and this method requires to prestore a training matrix and a noise square error.

6. Emre Telatar, et. al have pointed out in the document "Aslan Tchamkerten and I. Emre Telatar, On the Use of Training Sequences for Channel Estimation, IEEE TRANSACTIONS ON INFORMATION THEORY, VOL. 52, NO. 3, MARCH 2006" that the method that combines the channel estimation and reception can acquire the optimal performance. However, in practical applications, the two are actually separated, and the channel estimation greatly affects the system performance.

In the China Terrestrial Television Broadcasting (CTTB) system, as the used training sequence has the relatively weak correlative characteristic, when the method proposed by Che-Shen Yeh, et. al is used, the system performance is deteriorated in the case of direct correlation. The method provided by Yan-Chang Chen, et. al is too complicated and highly inapplicable. For the rest estimation methods, as in a mode 1 and a mode 3 of the CTTB, the phase of the training sequence might be changing, so the method proposed by Mark, Fimoff, et, al, in which the matrix and noise square error are stored to implement the channel estimation of LS, requires the use of a very large storage unit and is thus inapplicable. However, when the MMSE based estimation method proposed by Jin H. Kim, et. al is used, the on-line computational load is heavy and the delay in acquiring the training sequence through the decoding feedback is also unacceptable.

SUMMARY OF THE PRESENT INVENTION

An objective of the present invention is to provide a channel estimation method and system based on a time-domain training sequence which has a short delay and is simple. To achieve the above objectives and other objectives, the channel estimation method based on a time-domain training sequence provided in the present invention includes:

x. acquiring an initial channel vector used for channel estimation of a current frame;

y. based on a training sequence vector contained in a received receiving signal vector and the receiving signal vector, calculating an algorithm initial vector;

a. performing channel estimation based on the initial channel vector and the algorithm initial vector and using a conjugate gradient method based on a preprocessing matrix to acquire each channel estimation value;

b. performing noise reduction processing on each channel estimation value based on a first predetermined threshold value to acquire final channel estimation value.

The channel estimation system based on a time-domain training sequence provided in the present invention includes:

a first acquisition module, configured to acquire an initial channel vector for channel estimation of a current frame;

a calculation module, configured to calculate an algorithm initial vector based on a training sequence vector contained in a receiving signal vector and the receiving signal vector;

a channel estimation module, configured to perform estimation based on the initial channel vector and the algorithm initial vector and using a conjugate gradient method based on a preprocessing matrix to acquire each channel estimation value; and a noise reduction processing module, configured to perform noise reduction processing on each channel estimation value based on a first predetermined threshold value to acquire a final channel estimation value.

As an exemplary manner, the preprocessing matrix may be preset and may also be acquired based on the algorithm initial vector.

In conclusion, the channel estimation method and system based on a time-domain training sequence of the present invention have the advantages such as a shorter delay and a lower calculation complexity compared with each existing channel estimation method.

DETAILED DESCRIPTION OF THE PREFERRED EMBODIMENTS

Figure 1:
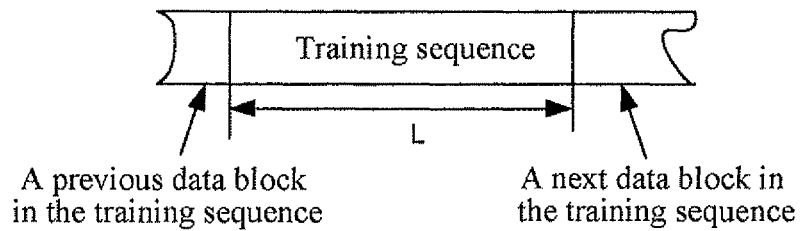
FIG. 1 is a schematic view of a signal frame sent by a terrestrial digital broadcast system.

FIG. 1 is a schematic view of a frame structure of a signal sent by a signal sending end in a terrestrial digital broadcast system, for example, a CTTB system. The frame signal contains a training sequence with the length L. Based on a frame of signal shown in FIG. 1, a corresponding signal received by a signal receiving end of a terrestrial digital broadcast system can be represented by: $\vec{r} = A\vec{h} + \vec{n}$, in which, $$\vec{r} = \begin{bmatrix} r_{-(L-1)} \\ \vdots \\ r_0 \\ \vdots \\ r_{L-1} \end{bmatrix}, A = \begin{bmatrix} t_0 & a_{-1} & \cdots & \cdots & a_{-(L-1)} \\ \vdots & \vdots & \ddots & \ddots & \vdots \\ t_{L-1} & t_{L-2} & \cdots & \cdots & t_0 \\ b_1 & t_{L-1} & \cdots & \cdots & t_1 \\ \vdots & \vdots & \ddots & \ddots & \vdots \\ b_{L-1} & b_{L-2} & \cdots & b_1 & t_{L-1} \end{bmatrix},$$

$$\vec{h} = \begin{bmatrix} h_{L-1} \\ h_{L-2} \\ \vdots \\ \vdots \\ h_0 \end{bmatrix}, \vec{n} = \begin{bmatrix} n_{-(L-1)} \\ n_{-(L-2)} \\ \vdots \\ \vdots \\ n_{L-1} \end{bmatrix},$$

$r_i$ is ith receiving signal in a symbol sampling rate, $h_i$ is a plurality of responses of a path corresponding to the delay of i symbol time, $t_i$ represents an ith sample signal in the training sequence, $(a_{-i})$th represents an ith sample signal from the end in a previous data block in the training sequence, $b_i$ is an ith signal in a next symbol block, and $n_i$ represents a noise component.

The matrix A is decomposed into: $A = T + U_1 + U_2$, in which, $$T = \begin{bmatrix} t_0 & 0 & \cdots & \cdots & 0 \\ \vdots & \vdots & \ddots & \ddots & \vdots \\ t_{L-1} & t_{L-2} & \cdots & \cdots & t_0 \\ 0 & t_{L-1} & \cdots & \cdots & t_1 \\ \vdots & \vdots & \ddots & \ddots & \vdots \\ 0 & 0 & \cdots & 0 & t_{L-1} \end{bmatrix}, U_1 = \begin{bmatrix} 0 & a_{-1} & \cdots & \cdots & a_{-(L-1)} \\ \vdots & \vdots & \ddots & \ddots & \vdots \\ 0 & 0 & \cdots & \cdots & a_{-1} \\ 0 & 0 & \cdots & \cdots & 0 \\ \vdots & \vdots & \ddots & \ddots & \vdots \\ 0 & 0 & \cdots & 0 & 0 \end{bmatrix},$$

$$U_2 = \begin{bmatrix} 0 & 0 & \cdots & \cdots & 0 \\ \vdots & \vdots & \ddots & \ddots & \vdots \\ 0 & 0 & \cdots & \cdots & 0 \\ b_1 & 0 & \cdots & \cdots & 0 \\ \vdots & \vdots & \ddots & \ddots & \vdots \\ b_{L-1} & b_{L-2} & \cdots & b_0 & 0 \end{bmatrix}.$$

As can be seen, after the signal receiving end receives the receiving signal vector $\vec{r}$, a training sequence vector T can be acquired through sampling, and subsequently the data contained in matrices $U_1$ and $U_2$ can be determined through the channel estimation. In the following, the process of channel estimation is described in detail through specific embodiments.

Figure 2:
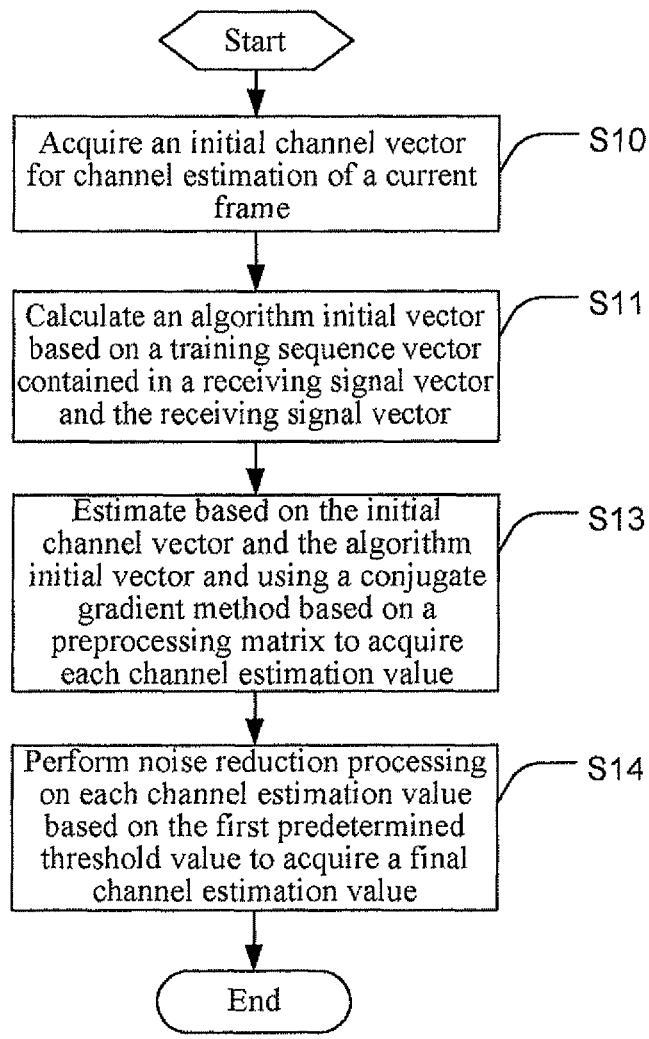
FIG. 2 is a flow chart of a channel estimation method based on a time-domain training sequence at a signal receiving end of a terrestrial digital broadcast system according to an aspect of the present invention.

FIG. 2 is a flow chart of a channel estimation method based on a time-domain training sequence in a terrestrial digital broadcast system according to an aspect of the present invention. The terrestrial digital broadcast system includes, but is not limited to, a CTTB system.

Specifically, in Step S10, a signal receiving end of a terrestrial digital broadcast system acquires an initial channel vector for channel estimation of a current frame.

As an exemplary manner, the signal receiving end can acquire the initial channel vector based on a channel estimation result of a previous frame. For example, a channel estimation result acquired from the channel estimation of the previous frame by the signal receiving end is h1. If noise reduction processing is already performed on the channel estimation result h1, the signal receiving end directly uses the channel estimation result h1 as an initial channel vector for the estimation of the current frame. If the noise reduction processing is not performed on the channel estimation result h1 yet, the signal receiving end performs noise reduction on the channel estimation result h1 through a predetermined threshold value, for example, a first predetermined threshold value, and uses the result after the noise reduction as the initial channel vector for estimation of the current frame. The noise reduction process is illustrated below.

As another exemplary manner, the signal receiving end may also correlate the training sequence vector contained in the receiving signal vector with a prestored training sequence to calculate the initial channel vector. The specific relevant process is already known by persons skilled in the art, so the detailed description is not provided here. For example, the signal receiving end performs noise reduction through a predetermined threshold value, for example, a first predetermined threshold value based on an estimation value acquired through correlation of the training sequence vector contained in the receiving signal vector and the prestored training sequence to acquire a result as an initial channel vector for estimation of the current frame.

Persons skilled in the art should understand that the manner that the signal receiving end acquires the initial channel vector is not limited to the above.

Next, in Step S11, the signal receiving end of the terrestrial digital broadcast system calculates an algorithm initial vector based on a training sequence vector contained in a received receiving signal vector and the receiving signal vector. For example, at the signal receiving end of the terrestrial digital broadcast system, the algorithm initial vector can be calculated based on the received receiving signal vector $\vec{r}$ containing the training sequence and the training sequence vector T. The method of calculating the algorithm initial vector may be determined based on the used channel estimation criterion. The channel estimation criterion includes, but is not limited to, the LS criterion, SLS criterion, the HLS criterion, the MMSE criterion, and the ML criterion.

For example, for the receiving signal vector $\vec{r}$, if the channel estimation is performed based on the LS criterion: $\vec{h} \rightarrow \min(E(\|\vec{r}-T\vec{h}\|))$, the expression of the channel estimation value can be acquired:

$$\vec{h} = S\vec{r} = \underbrace{(T'T+\rho I_{(L+1)}L)^{-1}}_{R^{-1}} \underbrace{T'\vec{r}}_{\vec{p}}.$$

Therefore, the signal receiving end of the terrestrial digital broadcast system can correspondingly use the following formulas to calculate the algorithm initial vectors R and $\vec{p}$ based on the expression:

$$R=T'T+\rho I_{(L+1)}L, \vec{p}=T'\vec{r},$$

in which $\rho$ is a predetermined value, L is the length of a training sequence, T' is the transposition of T, and $I_{(L+1)}$ is a unit matrix of a (L+1) dimension. $\rho$ can be a ratio of the data power to the training sequence. When power raising is not performed on the training sequence, $\rho$ is 1. After the raising is performed on the training sequence, $\rho$ is the reciprocal of the raising power.

Persons skilled in the art should understand that the method of calculating the algorithm initial vectors R and $\vec{p}$ is determined based on the channel expression acquired through the LS criterion. When other criteria are used, for example, when the MMSE criterion is used, the expression of the channel estimation value is different, and correspondingly, the method of calculating the algorithm initial vectors R and $\vec{p}$ is also adjusted accordingly, the detailed description of which is omitted here.

Next, in Step S13, the signal receiving end performs estimation based on the initial channel vector and the algorithm initial vector and using a conjugate gradient method based on a preprocessing matrix to acquire each channel estimation value.

$$\vec{h} = S\vec{r} = \underbrace{(T'T+\rho I_{(L+1)}L)^{-1}}_{R^{-1}} \underbrace{T'\vec{r}}_{\vec{p}}.$$

As an exemplary manner, for the expression of the channel estimation value acquired based on the LS estimation, the process that the signal receiving end performs channel estimation using a conjugate gradient method based on a preprocessing matrix can include the following steps.

First, the signal receiving end calculates all iterative initial values $\vec{p}_1$ and $\rho_0$ based on the initial channel vector $\vec{h}_0$ and the algorithm initial vectors R and $\vec{p}$ according to the following formulas:

$$\vec{r}_0 = \vec{p} - R\vec{h}_0, \vec{z}_0 = M^{-1}\vec{r}_0, \vec{p}_1 = \vec{z}_0, \rho_0 = \vec{r}_0^T \vec{z}_0.$$

Next, the signal receiving end then performs iterative calculation N times based on the iterative initial values $\vec{p}_1$ and $\rho_0$ to acquire each channel estimation value $\vec{h}_N$, in which the kth iterative calculation is:

$$\vec{w}=R\vec{p}_k, \vec{a}_k=\vec{p}_{k-1}/\vec{p}_k^T\vec{w},$$

$$\vec{h}_k=\vec{h}_{k-1}+\vec{a}_k\vec{p}_k, \vec{r}_k=\vec{r}_{k-1}-\vec{a}_k\vec{w},$$

$$\vec{z}_k=M^{-1}\vec{r}_k, \rho_k=\vec{r}_k^T\vec{z}_k,$$

$$\beta_k=\rho_k/\rho_{k-1}, \vec{p}_{k+1}=\vec{z}_k+\beta_k\circ\vec{p}_k,$$

in which, $\vec{p}_k^T$ is a conjugate matrix of $\vec{p}_k$, $\vec{r}_k^T$ is a conjugate matrix of $\vec{r}_k\vec{p}_k$, M is a preset preprocessing matrix, $\rho_k/\rho_{k-1}$ is the division of corresponding elements in $\rho_k$ and $\rho_{k-1}$, $\beta_k \circ \vec{p}_k$ is multiplication of corresponding elements in $\beta_k$ and $\vec{p}_k$. For example, based on the terrestrial digital broadcast system such as a CTTB system, when a mode 2 is used, the preprocessing matrix M can be preset as a unit matrix.

Persons skilled in the art should understand that the expression of the channel estimation value is acquired based on the estimation of the LS criterion, so that the expression of the channel estimation value acquired based on other criteria, for example, the estimation of the MMSE criterion is different, and correspondingly, the parameters in the gradient algorithm are also adjusted accordingly, the description of which is omitted here.

Next, in Step S14, the signal receiving end performs noise reduction processing on each channel estimation value based on the first predetermined threshold value to acquire a final channel estimation value. The setting of the first predetermined threshold value can be determined through the combination of a noise square error, a signal-to-noise ratio, and the existing channel envelope.

For example, each channel estimation value estimated by the signal receiving end is $$\vec{h},$$

the noise reduction processing performed on each channel estimation value based on the first predetermined threshold value is:

$$\vec{h} = f(\gamma \vec{h}).$$

That is, the signal receiving end first increases each channel estimation value by $\gamma$ times with $$\vec{h}$$

as the amplitude, and then performs comparison with the first predetermined threshold value. When smaller than the first predetermined threshold value, it is regarded as noise, and the channel estimation value is set to zero, which is represented by a function as follows:

$$f(\vec{\gamma h}) = \begin{cases} \vec{\gamma h} & \text{if } \text{abs}(\vec{\gamma h}) > th \\ 0 & \text{else} \end{cases},$$

in which th is the first predetermined threshold value.

It should be noted that γ is irrelevant to the channel type and noise and can be set according to the correlation and length of the training sequence. For example, for the mode 2 in the CTTB, γ can be set to 2.27.

In addition, it should be noted that the sequence of steps is not limited to the above. For example, Step S10 may also be performed after Step S11.

Figure 3:
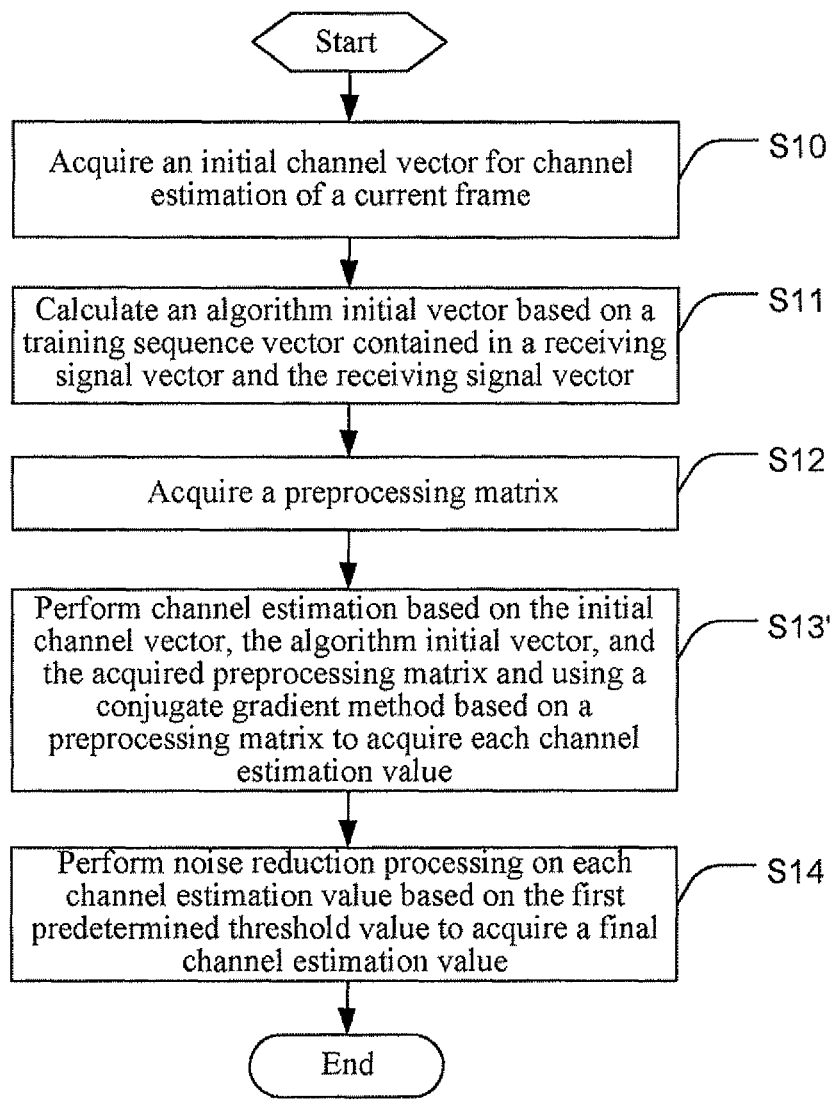
FIG. 3 is a flow chart of a channel estimation method based on a time-domain training sequence at a signal receiving end of a terrestrial digital broadcast system according to another aspect of the present invention.

FIG. 3 is a flow chart of a channel estimation method based on a time-domain training sequence in a terrestrial digital broadcast system according to an aspect of the present invention. The terrestrial digital broadcast system includes, but is not limited to, a CTTB system.

Specifically, Steps S10 and S11 are already illustrated in detail in the embodiment shown in FIG. 2, which are included in the manner of reference and the description is no longer repeated.

Next, in Step S12, the signal receiving end acquires a preprocessing matrix based on the algorithm initial vector.

For example, for a CTTB system that uses the mode 1 or 3, the expression of the channel acquired based on the LS estimation is:

$$\vec{h} = \underbrace{(T'T + \rho I_{(L+1)}L)^{-1}}_{R^{-1}} \underbrace{T'\vec{r}}_{\vec{p}}.$$

When the signal receiving end needs to acquire the channel estimation value by calculating the value of the expression, the signal receiving end can process the 0 matrix of (L+1)* (L+1) in the following manner based on the algorithm initial vector R to acquire the preprocessing matrix M:

$i=0, 1, \ldots L,$ when $i<d$, $M(i,i)=R(i,i); M(i,i+d)=R(i,i+d);$ otherwise, when $i<=L-d$, $M(i,i)=R(i,i); M(i,i+d)=R(i, i+d);(i,i-d)=R(i,i-d);$ in other cases, $M(i,i)=R(i,i); M(i,i-d)=R(i,i-d);$ where L is the length of a training sequence, d is the length of a complete sequence after a cyclic prefix is removed from the training sequence, R(i,i) is the value of the ith row and ith column in the algorithm initial vector R. The adopted procedure is represented as follows:

```
for i = 0: L
    M(i, :) = [ 0  0  ...  0 ];
                  L+1
    if i < d
        M(i, i) = R(i, i);
        M(i, i + d) = R(i, i + d);
    elseif i <= L - d
        M(i, i) = R(i, i);
        M(i, i + d) = R(i, i + d);
        M(i, i - d) = R(i, i - d);
    else
        M(i, i) = R(i, i);
        M(i, i - d) = R(i, i - d);
    endif
endfor
```

Persons skilled in the art should understand that, the preprocessing matrix is determined based on the expression of the channel acquired through the channel estimation using the LS criterion, for example, the expression, $$\vec{h} = S\vec{r} = \underbrace{(T'T + \rho I_{(L+1)}L)^{-1}}_{R^{-1}} \underbrace{T'\vec{r}}_{\vec{p}}.$$

Based on different channel estimation expressions, when the gradient algorithm is used, the used preprocessing matrices are also different. Therefore, the method that the signal receiving end acquires the preprocessing matrix is also different from above, which is no longer described in detail here.

Next, in Step S13', the signal receiving end performs estimation based on the initial channel vector, the algorithm initial vector, and the acquired preprocessing matrix and using a conjugate gradient method based on a preprocessing matrix to acquire each channel estimation value.

For example, for the channel expression:

$$\vec{h} = S\vec{r} = \underbrace{(T'T + \rho I_{(L+1)}L)^{-1}}_{R^{-1}} \underbrace{T'\vec{r}}_{\vec{p}},$$

the process that the signal receiving end performs channel estimation based on the initial channel vector $\vec{h}_0$, the algorithm initial vectors R and $\vec{p}$, and the acquired preprocessing matrix M and using a conjugate gradient method based on a preprocessing matrix is as below.

First, the signal receiving end calculates the iterative initial values $\vec{p}_1$ and $\rho_0$ based on the initial channel vector $\vec{h}_0$ and the algorithm initial vectors R and $\vec{p}$ according to the following formulas:

$\vec{r}_0 = \vec{p} - R\vec{h}_0$, $\vec{z}_0 = M^{-1}\vec{r}_0$, $\vec{p}_1 = \vec{z}_0$, $\rho_0 = \vec{r}_0^T \vec{z}_0$.

Next, the signal receiving end then performs iterative calculation N times based on the iterative initial values $\vec{p}_1$ and $\rho_0$ to acquire each channel estimation value $\vec{h}_N$, in which the kth iterative calculation is:

$\vec{w} = R\vec{p}_k$, $\vec{a}_k = \vec{p}_{k-1}/\vec{p}_k^T \vec{w}$, $\vec{h}_k = \vec{h}_{k-1} + \vec{a}_k \vec{p}_k$, $\vec{r}_k = \vec{r}_{k-1} - \vec{a}_k \vec{w}$, $\vec{z}_k = M^{-1}\vec{r}_k$, $\rho_k = \vec{r}_k^T \vec{z}_k$, $\beta_k = \rho_k/\rho_{k-1}$, $\vec{p}_{k+1} = \vec{z}_k + \beta_k \circ \vec{p}_k$, in which $\vec{p}_k^T$ is a conjugate matrix of $\vec{p}_k$, $\vec{r}_k^T$ is a conjugate matrix of $\vec{r}_k \vec{p}_k$, $\rho_k/\rho_{k-1}$ is the division between corresponding elements in $\rho_k$ and $\rho_{k-1}$, and $\beta_k \circ \vec{p}_k$ is the multiplication of corresponding elements in $\beta_k$ and $\vec{p}_k$.

Next, Step S14 is already described in detail in the embodiment in FIG. 2, which is included here in the manner of reference, and the description is no longer repeated here.

Figure 4:
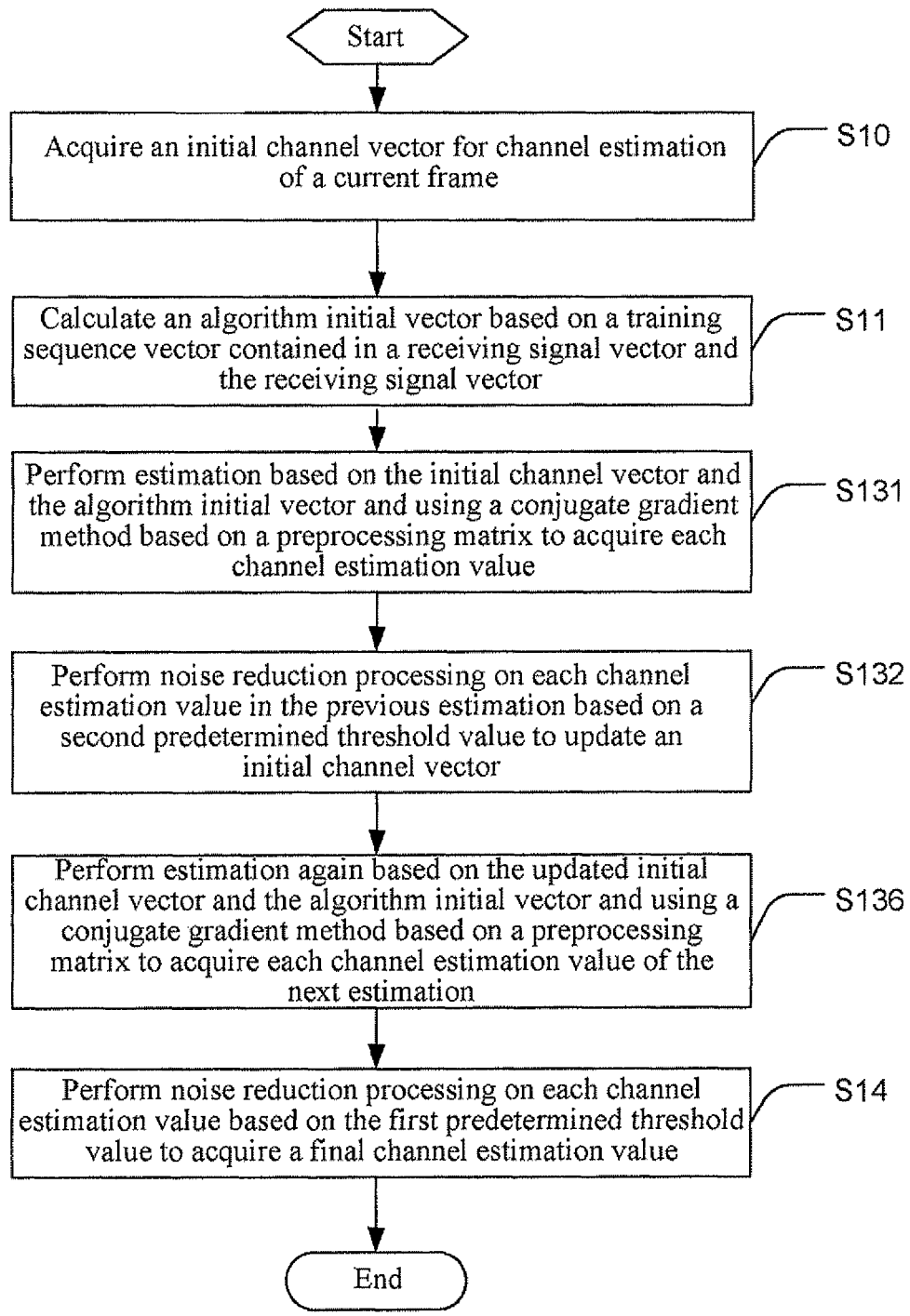
FIG. 4 is a flow chart of a channel estimation method based on a time-domain training sequence at a signal receiving end of a terrestrial digital broadcast system according to a further aspect of the present invention.

FIG. 4 is a flow chart of a channel estimation method based on a time-domain training sequence at a signal receiving end of a terrestrial digital broadcast system according to another aspect of the present invention.

Specifically, Steps S10 and S11 are already described in detail in the embodiment shown in FIG. 2, which are included here in the manner of reference, and the description is no longer repeated here.

Next, in Step S131, the signal receiving end performs estimation based on the initial channel vector and the algorithm initial vector and using a conjugate gradient method based on a preprocessing matrix to acquire each channel estimation value. The estimation process can be referred to the embodiment shown in FIG. 2, and the description is no longer repeated here.

Next, in Step S132, the signal receiving end performs noise reduction processing on each channel estimation value based on a second predetermined threshold value to update an initial channel vector. The second predetermined threshold value can be determined based on the first predetermined threshold value, for example, th1=η.th, 0<η<1, in which th1 is the second predetermined threshold value, and th is the first predetermined threshold value.

For example, the channel estimation value estimated by the signal receiving end is $$\vec{h},$$

and the noise reduction processing performed by the signal receiving end on each channel estimation value based on the second predetermined threshold value is:

$$f(\vec{\gamma h}) = \begin{cases} \vec{\gamma h} & \text{if } \text{abs}(\vec{\gamma h}) > th1 \\ 0 & \text{else} \end{cases}.$$

Next, in Step S136, the signal receiving end performs estimation again based on the updated initial channel vector and the algorithm initial vector and using a conjugate gradient method based on a preprocessing matrix to acquire each channel estimation value. For example, for the case that the signal receiving end performs estimation again based on the updated initial channel vector $$f(\vec{\gamma h})$$

and the algorithm initial vector and using a conjugate gradient method based on a preprocessing matrix, the estimation process can be referred to the embodiment shown in FIG. 2, the detailed description of which is no longer repeated here.

Next, Step S14 is already described in detail in the embodiment shown in FIG. 2, which is included here in the manner of reference, and the description is no longer repeated here.

It should be noted that persons skilled in the art should understand that Steps S132 and S136 can be performed repeatedly. For example, the signal receiving end performs S136 and returns to perform Steps S132 and S136 to perform channel estimation for the third time.

Further, in this embodiment, the step of acquiring the preprocessing matrix can be further included after Step S11. Correspondingly, in Steps S131 and S136, the channel estimation based on the conjugate gradient method of the preprocessing matrix can be performed based on the acquired preprocessing matrix. The acquisition of the preprocessing matrix and the channel estimation based on the conjugate gradient method of the preprocessing matrix based on the acquired preprocessing matrix can be referred to the embodiment shown in FIG. 3, the detailed description of which is no longer repeated here.

Similarly, Step S10 can also be performed after S11.

Figure 5:
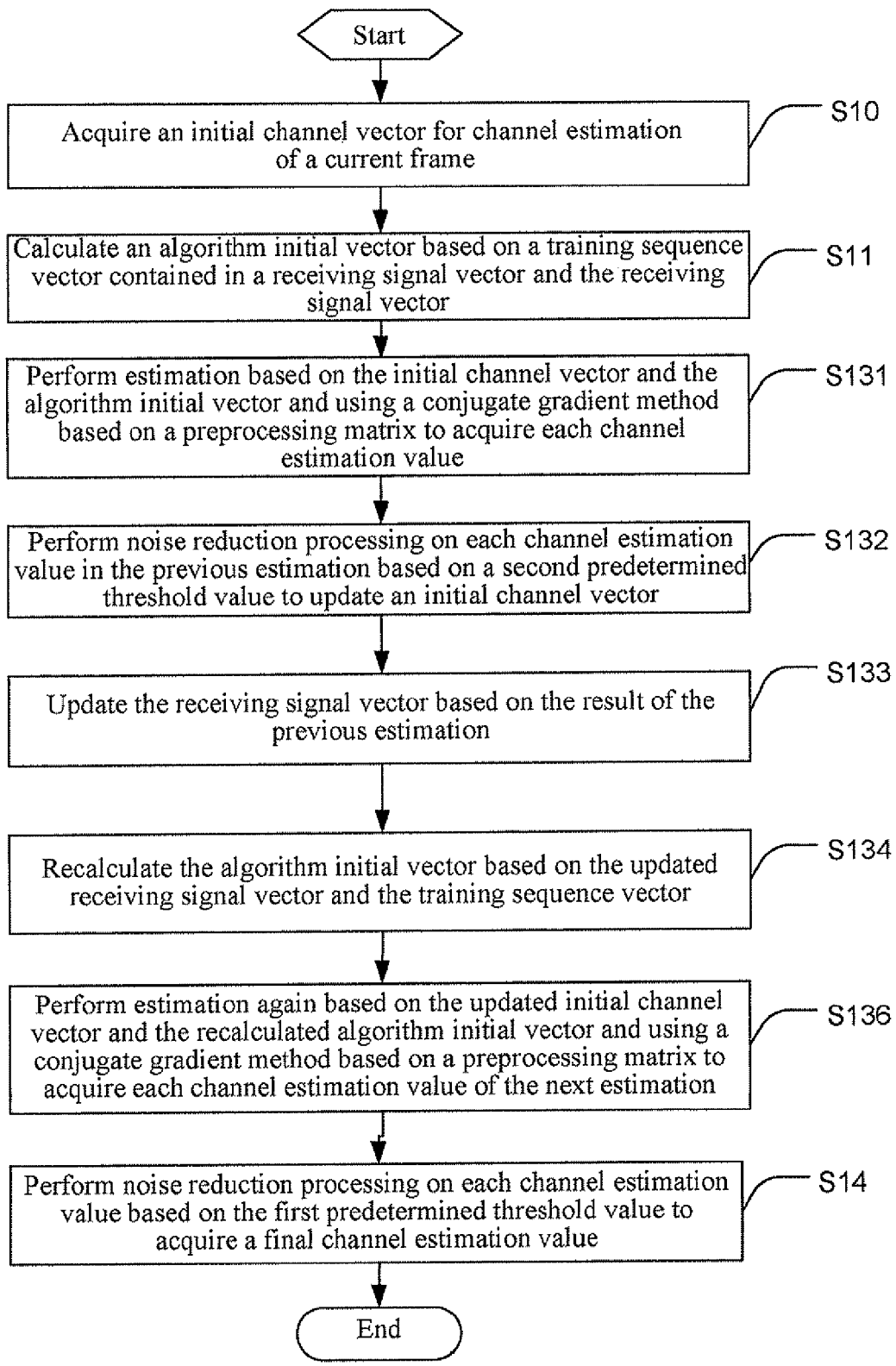
FIG. 5 is a flow chart of a channel estimation method based on a time-domain training sequence at a signal receiving end of a terrestrial digital broadcast system according to a further aspect of the present invention.

FIG. 5 is a flow chart of a channel estimation method based on a time-domain training sequence at a signal receiving end of a terrestrial digital broadcast system according to a further aspect of the present invention.

Specifically, Steps S10 and S11 are already described in detail in the embodiment shown in FIG. 2, which is included here in the manner of reference, and the description is no longer repeated. Steps S131 and S132 are already described in detail in the embodiment shown in FIG. 4, which are included here in the manner of reference, and the description is no longer repeated.

Next, in Step S133, the signal receiving end updates the receiving signal vector based on the result of the previous estimation.

As an exemplary manner, the signal receiving end can first determine the data of a previous data symbol block of a training sequence in the receiving signal vector based on the result of the previous estimation, and then counteract the data of the previous data symbol block of the training sequence in the receiving signal vector, so as to update the receiving signal vector.

For example, the receiving signal vector is: $\vec{r}=A\vec{h}+\vec{n}$, in which $$A = T + U_1 + U_2 = \begin{bmatrix} t_0 & 0 & \ldots & \ldots & 0 \\ \vdots & \vdots & \ddots & \ddots & \vdots \\ t_{L-1} & t_{L-2} & \ldots & \ldots & t_0 \\ 0 & t_{L-1} & \ldots & \ldots & t_1 \\ \vdots & \vdots & \ddots & \ddots & \vdots \\ 0 & 0 & \ldots & 0 & t_{L-1} \end{bmatrix} +$$

$$\begin{bmatrix} 0 & a_{-1} & \ldots & \ldots & a_{-(L-1)} \\ \vdots & \vdots & \ddots & \ddots & \vdots \\ 0 & 0 & \ldots & \ldots & a_{-1} \\ 0 & 0 & \ldots & \ldots & 0 \\ \vdots & \vdots & \ddots & \ddots & \vdots \\ 0 & 0 & \ldots & 0 & 0 \end{bmatrix} + \begin{bmatrix} 0 & 0 & \ldots & \ldots & 0 \\ \vdots & \vdots & \ddots & \ddots & \vdots \\ 0 & 0 & \ldots & \ldots & 0 \\ b_1 & 0 & \ldots & \ldots & 0 \\ \vdots & \vdots & \ddots & \ddots & \vdots \\ b_{L-1} & b_{L-2} & \ldots & b_0 & 0 \end{bmatrix},$$

and correspondingly, $\vec{r}=T\vec{h}+U_1\vec{h}+U_2\vec{h}+\vec{n}$. The signal receiving end can determine the data $U_1\vec{h}$ in the previous data symbol block of the training sequence based on the previous channel estimation. Therefore, the signal receiving end counteracts $U_1\vec{h}$ from the receiving signal vector. The updated receiving signal vector is:

$$\vec{r}' = \vec{r} - U_1\vec{h} = T\vec{h} + U_2\vec{h} + \vec{n}'.$$

As another exemplary manner, the signal receiving end may also first determine the data contained in the previous data symbol block and the data contained in the next data symbol block of the training sequence in the receiving signal vector based on the result of the previous estimation, so as to further counteract both the data contained in the previous data symbol block and the data contained in the next data symbol block of the training sequence in the receiving signal vector, thereby updating the receiving signal vector.

For example, for the receiving signal vector: $\vec{r} = T\vec{h} + U_1\vec{h} + U_2\vec{h} + \vec{n}$, as the signal receiving end may determine the data $U_1\vec{h}$ in the previous data symbol block and the data $U_2\vec{h}$ in the next symbol block of the training sequence based on the result of the previous estimation, the signal receiving end can remove $U_1\vec{h}$ and $U_2\vec{h}$ from the receiving signal vector together, and the updated receiving signal vector is:

$$\vec{r}'' = \vec{r} - U_1\vec{h} - U_2\vec{h} = T\vec{h} + \vec{n}'.$$

Next, in Step S134, the signal receiving end recalculates the algorithm initial vector based on the training sequence vector and the updated receiving signal vector. For example, the signal receiving end recalculates the algorithm initial vector based on the updated receiving signal vector $\vec{r}'$ and training sequence vector T.

For example, for the receiving signal with the expression: $\vec{r}' = T\vec{h} + U_2\vec{h} + \vec{n}'$, if the estimation is performed based on the LS criterion, the acquired expression of the channel estimation is $$\vec{h} = S\vec{r} = \underbrace{(T'T + \rho D)^{-1}}_{R^{-1}} \underbrace{T'\vec{r}'}_{\vec{p}},$$

D=diag{[L−1 L−2 ... 10]}. Therefore, based on the expression: $\vec{h} = S\vec{r}'$, the signal receiving end can recalculate the algorithm initial vectors R and $\vec{p}$ according to the following formulas: $R = T'T + \rho D$, $\vec{p} = T'\vec{r}'$.

For example, for the receiving signal with the expression: $\vec{r}'' = T\vec{h} + \vec{n}'$, if the estimation is performed based on the LS criterion, the acquired expression of the channel estimation is:

$$\vec{h} = S\vec{r} = \underbrace{(T'T)^{-1}}_{R^{-1}} \underbrace{T'\vec{r}''}_{\vec{p}}.$$

Therefore, based on the expression:

$$\vec{h} = S\vec{r}'',$$

the signal receiving end can recalculate the algorithm initial vectors R and $\vec{p}$ according to the following formulas:

$R = T'T$, $\vec{p} = T'\vec{r}''$.

Persons skilled in the art should understand that the above method of recalculating the algorithm initial vectors R and $\vec{p}$ is only exemplary, rather than to limit the present invention. In fact, if other criteria are adopted, for example, the MMSE criterion is adopted to perform channel estimation on the receiving signal vector $\vec{r}'$ or $\vec{r}''$, the acquired expression of the channel estimation is different, and correspondingly, the method that the signal receiving end calculates the algorithm initial vectors R and $\vec{p}$ is adjusted based on the expression of the channel estimation, the detailed description of which is no longer repeated here.

Next, in Step S136', the signal receiving end performs estimation again based on the updated initial channel vector and the recalculated algorithm initial vector and using a conjugate gradient method based on a preprocessing matrix to acquire each channel estimation value. For example, the signal receiving end performs estimation again based on the updated initial channel vector $$f(\gamma\vec{h})$$

and the recalculated algorithm initial vectors $R = T'T + \rho D$ and $\vec{p} = T'\vec{r}'$ and using a conjugate gradient method based on a preprocessing matrix to acquire each channel estimation value. Further, for example, the signal receiving end performs estimation again based on the updated initial channel vector $$f(\gamma\vec{h})$$

and the recalculated algorithm initial vectors $R = T'T$ and $\vec{p} = T'\vec{r}''$ and using a conjugate gradient method based on a preprocessing matrix to acquire each channel estimation value. The specific estimation process can be referred to the embodiment shown in FIG. 2, the detailed description of which is no longer repeated here.

Next, Step S14 is already described in detail in the embodiment shown in FIG. 2, which is included here in the manner of reference, and the description is no longer repeated here.

It should be noted that the sequence of performing the steps is not limited to the above. For example, Step S132 may also be performed after Step S134. That is, the signal receiving end performs Step S131, performs Steps S133 and S134 next, and then performs Step S132. Step S10 may be subsequent to Step S11.

Furthermore, Steps S132, S133, S34, and S136' can be performed repeatedly. That is, the signal receiving end performs Step S136' and then returns to perform Steps S132, S133, S134, and S136' to perform the channel estimation for the third time, the detailed description of which is no longer repeated here.

Figure 6:
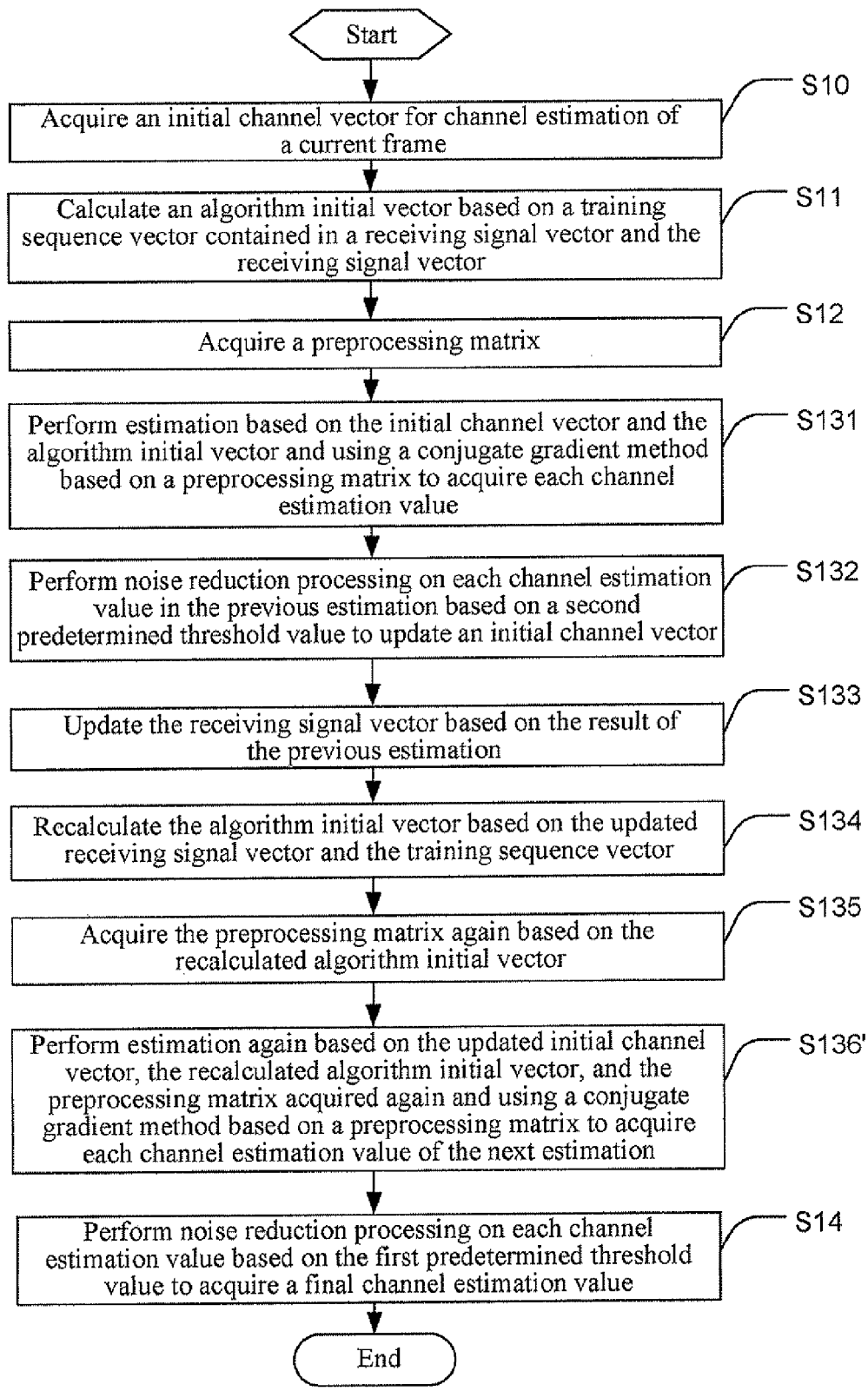
FIG. 6 is a flow chart of a channel estimation method based on a time-domain training sequence at a signal receiving end of a terrestrial digital broadcast system according to a further aspect of the present invention.

FIG. 6 is a flow chart of a channel estimation method based on a time-domain training sequence at a signal receiving end of a terrestrial digital broadcast system according to a further aspect of the present invention.

Specifically, Steps S10 and S11 are already described in detail in the embodiment shown in FIG. 2, which are included here in the manner of reference, and the description is no longer repeated here. Step S12 is already described in detail in the embodiment shown in FIG. 3, which is also included here in the manner of reference, and the description is no longer repeated here. Steps S131 to S134 are already described in detail in the embodiment shown in FIG. 5, which are included here which is included here in the manner of reference, and the description is no longer repeated.

Next, in Step S135, the signal receiving end acquires the preprocessing matrix again based on the recalculated algorithm initial vector. For example, the signal receiving end processes the 0 matrix of (L+1)*(L+1) again according to the method in the embodiment shown in FIG. 3 based on the recalculated algorithm initial vector to acquire the preprocessing matrix again.

Next, in Step S136", the signal receiving end performs channel estimation based on the updated initial channel vector, the recalculated algorithm initial vector, and the preprocessing matrix acquired again and using a conjugate gradient method based on a preprocessing matrix to acquire each channel estimation value. The specific process can be referred to the embodiment shown in FIG. 3, the detailed description of which is no longer repeated here.

Finally, Step S14 is already described in detail in the embodiment shown in FIG. 2, and the description is no longer repeated here.

Similarly, the signal receiving end performs Step S136" and then returns to Step S131 to start the channel estimation for the third time. In addition, Step S10 may also be performed after Step S11.

Figure 7:
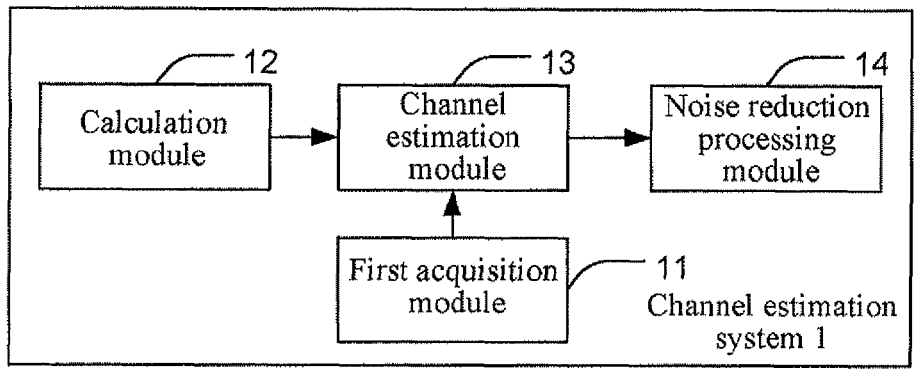
FIG. 7 is a schematic view of a channel estimation system based on a time-domain training sequence according to an aspect of the present invention.

FIG. 7 is a schematic view of a channel estimation system based on a time-domain training sequence according to an aspect of the present invention. The channel estimation system 1 includes: a first acquisition module 11, a calculation module 12, a channel estimation module 13, and a noise reduction processing module 14.

Specifically, the first acquisition module 11 acquires an initial channel vector used for channel estimation of a current frame.

As an exemplary manner, the first acquisition module 11 may include a second acquisition subunit (not shown), which is configured to acquire the initial channel vector based on a channel estimation result of a previous frame. For example, the channel estimation result acquired through the channel estimation on the previous frame by the signal estimation system 1 is h1. If noise reduction processing is already performed on the channel estimation result h1, the second acquisition subunit directly uses the channel estimation result h1 as the initial channel vector for the estimation of the current frame. If noise reduction processing is not performed on the channel estimation result h1 yet, the second acquisition subunit performs noise reduction on the channel estimation result h1 through a predetermined threshold value, for example, a first predetermined threshold value, and uses the result after the noise reduction as the initial channel vector for the estimation of the current frame. The process of the noise reduction is illustrated below.

As another exemplary manner, the first acquisition module 11 may also include a fourth calculation subunit (not shown), which is configured to correlate the training sequence vector contained in the receiving signal vector with a prestored training sequence to calculate the initial channel vector. The specific relevant process is already known to persons skilled in the art, the detailed description of which is thus no longer repeated here. For example, the fourth calculation subunit performs noise reduction through a predetermined threshold value, for example, a first predetermined threshold value on the estimation value acquired based on the correlation of the training sequence vector contained in the receiving signal vector and the prestored training sequence to acquire a result as the initial channel vector for the estimation of the current frame.

Persons skilled in the art should understand that the manner that the first acquisition module 11 acquires the initial channel vector is not limited to the above.

Next, the calculation module 12 calculates an algorithm initial vector based on a training sequence vector contained in a receiving signal vector and the received receiving signal vector. For example, the calculation module 12 can calculate the algorithm initial vector based on the received receiving signal vector $\vec{r}$ and training sequence vector T containing the training sequence both. The method of calculating the algorithm initial vector may be determined based on the used channel estimation criterion. The channel estimation criterion includes, but is not limited to, the LS criterion, the SLS criterion, the HLS criterion, the MMSE criterion, and the ML criterion.

As an exemplary method, the calculation module 12 can include: a third calculation subunit (not shown). For example, for the receiving signal vector $\vec{r}$, if the channel estimation is performed based on the LS criterion: $\vec{h} \rightarrow \min(E(\|\vec{r} - T\vec{h}\|))$, the expression of the channel estimation value $$\vec{h} = S\vec{r} = \underbrace{(T'T + \rho I_{(L+1)}L)^{-1}}_{R^{-1}} \underbrace{T'\vec{r}}_{\vec{p}}$$

can be acquired. Therefore, the third calculation subunit can calculate the algorithm initial vectors R and $\vec{p}$ based on the expression by using the following formulas:

$$R = T'T + \rho I_{(L+1)}L, \ \vec{p} = T'\vec{r},$$

in which ρ is a predetermined value, L is the length of a training sequence, T is the transposition of T, $I_{(L+1)}$ is the unit matrix of a (L+1) dimension. P can be the ratio of the data power to the training sequence. When power raising is not performed on the training sequence, ρ is 1. After the training sequence is raised, ρ is the reciprocal of the raised power.

Persons skilled in the art should understand that the method that the third calculation subunit calculates the algorithm initial vectors R and $\vec{p}$ is determined based on the channel expression acquired by the LS criterion. When other criteria are adopted, for example, the MMSE criterion is adopted, the expression of the channel estimation value is different, and correspondingly, the method that the calculation module 12 calculates the algorithm initial vectors R and $\vec{p}$ is also adjusted accordingly, the detailed description of which is no longer repeated here.

Next, the channel estimation module 13 performs estimation based on the initial channel vector and the algorithm initial vector and using a conjugate gradient method based on a preprocessing matrix to acquire each channel estimation value.

For example, for the calculation of the channel estimation value based on the expression of the channel estimation value $$\vec{h} = S\vec{r} = \underbrace{(T'T + \rho I_{(L+1)}L)^{-1}}_{R^{-1}} \underbrace{T'\vec{r}}_{\vec{p}}$$

acquired through the LS estimation, the channel estimation module 13 can include: an iterative initial value calculation unit (not shown) and an iteration unit (not shown). The iterative initial value calculation unit is configured to calculate the iterative initial values $\vec{p}_1$ and $\rho_0$ based on the initial channel vector $\vec{h}_0$ and the algorithm initial vectors R and $\vec{p}$ according to the following formulas:

$$\vec{r}_0 = \vec{p} - R\vec{h}_0, \ \vec{z}_0 = M^{-1}\vec{r}_0, \ \vec{p}_1 = \vec{z}_0, \ \rho_0 = \vec{r}_0^T \vec{z}_0.$$

The iteration unit is configured to perform iterative calculation N times based on the iterative initial values $\vec{p}_1$ and $\rho_0$ to acquire each channel estimation value $\vec{h}_N$. The iterative calculation for the kth time is:

$$\vec{w}=R\vec{p}_k, \vec{a}_k=\vec{p}_{k-1}/\vec{p}_k^T\vec{w},$$

$$\vec{h}_k=\vec{h}_{k-1}+\vec{a}_k\vec{p}_k, \vec{r}_k=\vec{r}_{k-1}-\vec{a}_k\vec{w},$$

$$\vec{z}_k=M^{-1}\vec{r}_k, \rho_k=\vec{r}_k^T\vec{z}_k,$$

$$\beta_k=\rho_k/\rho_{k-1},$$

in which, $\vec{p}_k^T$ is a conjugate matrix of $\vec{p}_k$, $\vec{r}_k^T$ is a conjugate matrix of $\vec{r}_k$ $\vec{p}_k, \rho_k/\rho_{k-1}$ is the division of corresponding elements in $\rho_k$ and $\rho_{k-1}$, $\beta_k \circ \vec{p}_k$ is multiplication of corresponding elements in $\beta_k$ and $\vec{p}_k$, M is a preset preprocessing matrix. For example, when the terrestrial digital broadcast system, for example, the CTTB system uses a mode 2, the preprocessing matrix M can be set as a unit matrix.

Persons skilled in the art should understand that the expression of the channel estimation value can be acquired through the estimation based on the LS criterion. Therefore, the channel expression acquired through the estimation based on other criteria, for example, the MMSE criterion, and correspondingly, the parameters in the gradient algorithm based on the preprocessing matrix are also adjusted accordingly, the detailed description of which is no longer repeated here.

Next, the noise reduction processing module 14 performs noise reduction processing on each channel estimation value based on the first predetermined threshold value to acquire the final channel estimation value. The setting of the first predetermined threshold value can be determined through a combination of a noise square error, a signal-to-noise ratio, and an existing channel envelope.

For example, each channel estimation value estimated by the channel estimation module 13 is $$\vec{h},$$

the case that the noise reduction processing module 14 performs noise reduction processing on each channel estimation value based on the first predetermined threshold value is:

$$\vec{h} = f(\gamma\vec{h}).$$

That is, the noise reduction processing module 14 first raises each channel estimation value by $\gamma$ times with $$\vec{h}$$

as an amplitude, and then performs comparison with the first predetermined threshold value. It is regarded as noise when smaller than the first predetermined threshold value, and the channel estimation value is set to zero, which is represented by a function as follows:

$$f(\gamma\vec{h}) = \begin{cases} \gamma\vec{h} & \text{if } \text{abs}(\gamma\vec{h}) > th \\ 0 & \text{else} \end{cases},$$

in which th is the first predetermined threshold value.

It should be noted that $\gamma$ is irrelevant to the channel type and noise and can be set according to the correlation and length of the training sequence. For example, for the mode 2 in the CTTB, $\gamma$ can be set to 2.27.

Figure 8:
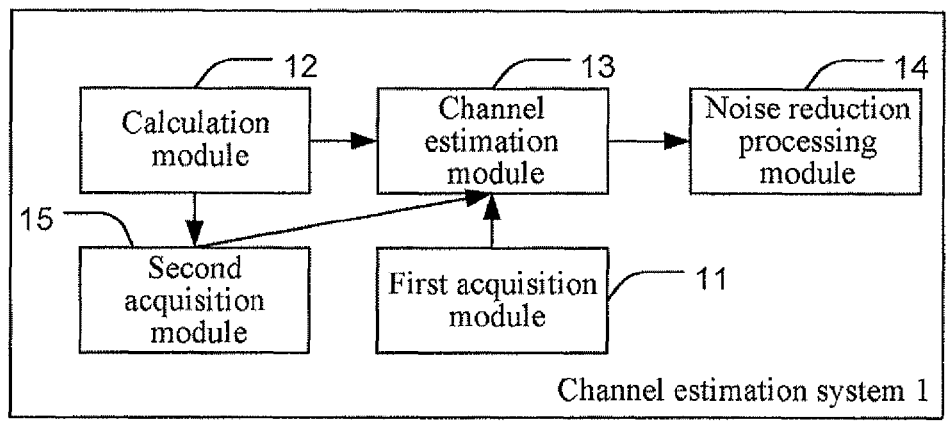
FIG. 8 is a schematic view of a channel estimation system based on a time-domain training sequence according to another aspect of the present invention.

FIG. 8 is a schematic view of a channel estimation system based on a time-domain training sequence according to an aspect of the present invention. The channel estimation system 1 includes: a first acquisition module 11, a calculation module 12, a second acquisition module 15, a channel estimation module 13, and a noise reduction processing module 14.

Specifically, the first acquisition module 11 and the calculation module 12 are already described in detail in the embodiment shown in FIG. 7, which are included here in the manner of reference, and the description is no longer repeated.

Next, the second acquisition module 15 acquires a preprocessing matrix based on an algorithm initial vector.

As an exemplary manner, the second acquisition module 15 may include a first acquisition subunit (not shown), which is configured to acquire the preprocessing matrix based on the algorithm initial vector. For example, for a CTTB system that uses a mode 1 or 3, the channel expression acquired based on the LS estimation is:

$$\vec{h} = \underbrace{(T'T + \rho I_{(L+1)}L)^{-1}}_{R^{-1}}T'\underbrace{\vec{r}}_{\vec{p}}.$$

If the signal receiving system needs to calculate the value of the expression to acquire the channel estimation value, the first acquisition subunit may process the 0 matrix of $(L+1)*(L+1)$ in the following manner to acquire the preprocessing matrix M based on the algorithm initial vector R:

$i=0, 1, \ldots L,$ when $i<d$, $M(i,i)=R(i,i);M(i,i+d)=R(i,i+d);$ otherwise, when $i<=L-d$, $M(i,i)=R(i,i);M(i,i+d)=R(i,i+d);(i,i-d)=R(i,i-d);$ in other cases, $M(i,i)=R(i,i);M(i,i-d)=R(i,i-d);$ in which L is the length of a training sequence, d is the length of the complete sequence after a cyclic prefix is removed from the training sequence, and R(i, i) is the value in the ith row and ith column in the algorithm initial vector R. The used procedure is represented as follows:

```
for i = 0: L
    M(i, :) = [ 0  0  ...  0 ];
                  L+1
    if i < d
        M(i, i) = R(i, i);
        M(i, i + d) = R(i, i + d);
    elseif i <= L - d
        M(i, i) = R(i, i);
        M(i, i + d) = R(i, i + d);
        M(i, i - d) = R(i, i - d);
```

```
            else
                M(i, i) = R(i, i);
                M(i, i – d) = R(i, i – d);
            endif
        endfor
```

Persons skilled in the art should understand that the preprocessing matrix is determined based on the channel expression acquired through channel estimation using the LS criterion, for example, the expression $$\vec{\hat{h}} = S\vec{r} = \underbrace{(T'T + \rho I_{(L+1)}L)^{-1}}_{R^{-1}} \underbrace{T'\vec{r}}_{\vec{p}}.$$

Based on different expressions of channel estimation, when the gradient algorithm is adopted, the used preprocessing matrix is also different, so that the manner that the second acquisition module 15 acquires the preprocessing matrix is also different from above, the detailed description of which is no longer repeated here.

Next, the channel estimation module 13 performs estimation based on the initial channel vector, the algorithm initial vector, and the acquired preprocessing matrix and using a conjugate gradient method based on a preprocessing matrix to acquire each channel estimation value.

For example, for the channel expression:

$$\vec{\hat{h}} = S\vec{r} = \underbrace{(T'T + \rho I_{(L+1)}L)^{-1}}_{R^{-1}} \underbrace{T'\vec{r}}_{\vec{p}},$$

the channel estimation module 13 performs channel estimation based on the initial channel vector the algorithm initial vectors R and $\vec{p}$, and the acquired preprocessing matrix M and using a conjugate gradient method based on a preprocessing matrix. As an exemplary manner, the channel estimation module 13 may include: an iterative initial value calculation unit and an iteration unit. The iterative initial value calculation unit is configured to:

calculate the iterative initial values $\vec{p}_1$ and $\rho_0$ based on the initial channel vector $\vec{h}_0$ and the algorithm initial vectors R and $\vec{p}$ according to the following formulas:

$$\vec{r}_0 = \vec{p} - R\vec{h}_0, \ \vec{z}_0 = M^{-1}\vec{r}_0, \ \vec{p}_1 = \vec{z}_0, \ \rho_0 = \vec{r}_0^T \vec{z}_0.$$

The iteration unit is configured to perform iterative calculation N times based on the iterative initial values $\vec{p}_1$ and $\rho_0$ to acquire each channel estimation value $\vec{h}_N$, in which the iterative calculation for the kth time is:

$$\vec{w} = R\vec{p}_k, \ \vec{a}_k = \vec{p}_{k-1}/\vec{p}_k^T\vec{w},$$

$$\vec{h}_k = \vec{h}_{k-1} + \vec{a}_k \vec{p}_k, \ \vec{r}_k = \vec{r}_{k-1} - \vec{a}_k \vec{w}$$

$$\vec{z}_k = M^{-1}\vec{r}_k, \ \rho_k = \vec{r}_k^T\vec{z}_k,$$

$$\beta_k = \rho_k/\rho_{k-1}, \ \vec{p}_{k+1} = \vec{z}_k + \beta_k \circ \vec{p}_k$$

in which, $\vec{p}_k^T$ is a conjugate matrix of $\vec{p}_k$, $\vec{r}_k^T$ is a conjugate matrix of $\vec{r}_k\vec{p}_k$, $\rho_k/\rho_{k-1}$ is the division of corresponding elements in $\rho_k$ and $\rho_{k-1}$, and $\beta_k \circ \vec{p}_k$ is multiplication of corresponding elements in $\beta_k$ and $\vec{p}_k$.

Next, the work process of the noise reduction processing module 14 is already described in detail in the embodiment shown in FIG. 7, which is included here in the manner of reference, and the description is no longer repeated.

Figure 9:
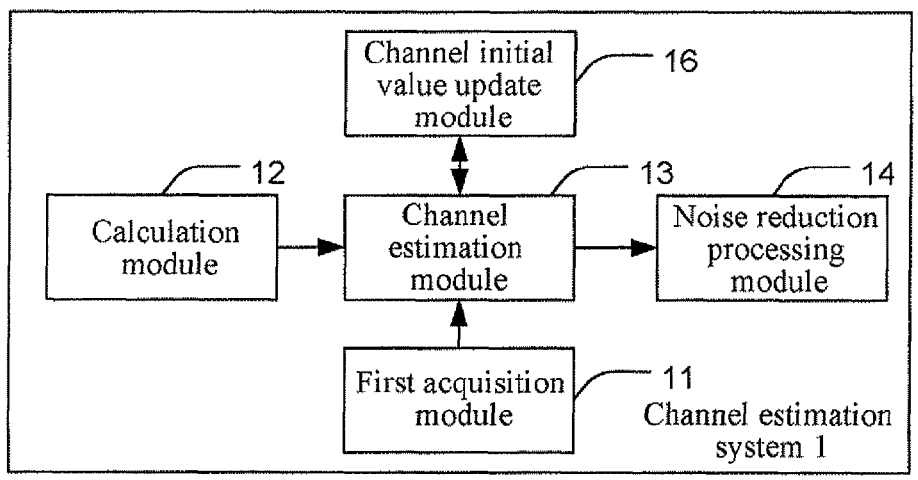
FIG. 9 is a schematic view of a channel estimation system based on a time-domain training sequence according to a further aspect of the present invention.

FIG. 9 is a schematic view of a channel estimation system based on a time-domain training sequence according to another aspect of the present invention. the channel estimation system 1 include: first acquisition module 11, calculation module 12, channel estimation module 13, channel initial value update module 16 and noise reduction processing module 14.

Specifically, first acquisition module 11 and calculation module 12 is already described in detail in the embodiment shown in FIG. 7, which is included here in the manner of reference, and the description is no longer repeated here.

Next, the channel estimation module 13 performs estimation based on the initial channel vector and the algorithm initial vector and using a conjugate gradient method based on a preprocessing matrix to acquire each channel estimation value. The estimation process can be referred to the embodiment shown in FIG. 7, and the description is no longer repeated here.

Next, the channel initial value update module 16 performs noise reduction processing on each channel estimation value based on the second predetermined threshold value to update the initial channel vector. The second predetermined threshold value can be determined based on the first predetermined threshold value, for example, th1=η.th, 0<η<1, in which th1 is the second predetermined threshold value and th is the first predetermined threshold value.

For example, each channel estimation value estimated by the channel estimation module 13 is $$\vec{\hat{h}}.$$

The channel initial value update module 16 performs noise reduction processing on each channel estimation value based on the second predetermined threshold value as follows:

$$f(\gamma\vec{\hat{h}}) = \begin{cases} \gamma\vec{\hat{h}} & \text{if } \text{abs}(\gamma\vec{\hat{h}}) > th1 \\ 0 & \text{else} \end{cases}.$$

Next, the channel estimation module 13 performs estimation again based on the updated initial channel vector and the algorithm initial vector and using a conjugate gradient method based on a preprocessing matrix to acquire each channel estimation value. For example, the channel estimation module 13 performs estimation again based on the updated initial channel vector $f(\gamma\vec{\hat{h}})$ and the algorithm initial vector and using a conjugate gradient method based on a preprocessing matrix. The estimation process can be referred to the embodiment shown in FIG. 7, the detailed description of which is no longer repeated here.

Next, the work process of the noise reduction processing module 14 is already described in detail in the embodiment shown in FIG. 7, which is included here in the manner of reference, and the description is no longer repeated here.

It should be noted that persons skilled in the art should understand that the work of the channel estimation module 13 and the channel initial value update module 16 can be performed repetitively. For example, after the channel estimation module 13 performs the channel estimation again, the channel initial value update module 16 then performs the initial channel vector update, and subsequently the channel estimation module 13 performs channel estimation for the third time.

Furthermore, the channel estimation system may further include a second acquisition module 15, and correspondingly the channel estimation module 13 performs channel estimation based on the preprocessing matrix acquired by the acquisition module 15. The process that the acquisition module 15 acquires the preprocessing matrix and the process that the channel estimation module 13 performs channel estimation based on the preprocessing matrix acquired by the acquisition module 15 can be referred to the embodiment shown in FIG. 8, the detailed description of which is no longer repeated here.

Figure 10:
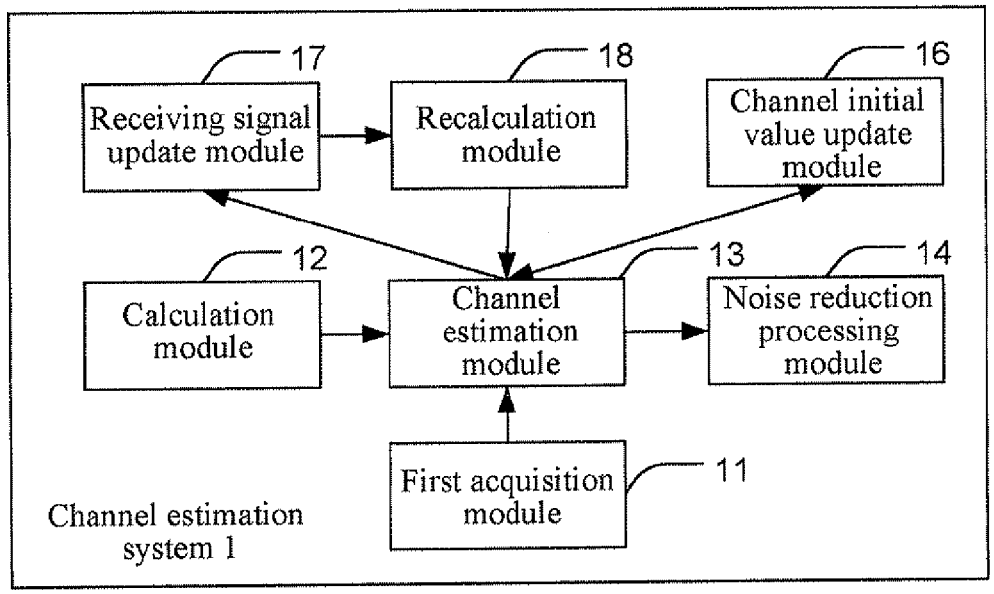
FIG. 10 is a schematic view of a channel estimation system based on a time-domain training sequence according to a further aspect of the present invention.

FIG. 10 is a schematic view of a channel estimation system based on a time-domain training sequence according to a further aspect of the present invention. The channel estimation system 1 includes: a first acquisition module 11, a calculation module 12, a channel estimation module 13, a channel initial value update module 16, a receiving signal update module 17, a recalculation module 18, and a noise reduction processing module 14.

Specifically, the first acquisition module 11 and the calculation module 12 are already described in detail in the embodiment shown in FIG. 7, which are included here in the manner of reference, and the description is no longer repeated. The processes that the channel estimation module 13 performs channel estimation based on the algorithm initial vector provided by the calculation module 12 and the channel initial value update module 16 performs initial channel vector update based on the estimation of the channel estimation module 13 are already described in detail in the embodiment shown in FIG. 9, which are included here in the manner of reference, and the description is no longer repeated.

Next, the receiving signal update module 17 updates the receiving signal vector based on the result of the previous estimation.

As an exemplary manner, the receiving signal update module 17 can include a first update unit (not shown), which is configured to determine data of a previous data symbol block of a training sequence in the receiving signal vector based on the result of the previous estimation, and then counteract the data of the previous data symbol block of the training sequence in the receiving signal vector, so as to update the receiving signal vector.

For example, the receiving signal vector is: $\vec{r} = A\vec{h} + \vec{n}$, in which, $$A = T + U_1 + U_2 = \begin{bmatrix} t_0 & 0 & \cdots & \cdots & 0 \\ \vdots & \vdots & \ddots & \ddots & \vdots \\ t_{L-1} & t_{L-2} & \cdots & \cdots & t_0 \\ 0 & t_{L-1} & \cdots & \cdots & t_1 \\ \vdots & \vdots & \ddots & \ddots & \vdots \\ 0 & 0 & \cdots & 0 & t_{L-1} \end{bmatrix} +$$

-continued
$$\begin{bmatrix} 0 & a_{-1} & \cdots & \cdots & a_{-(L-1)} \\ \vdots & \vdots & \ddots & \ddots & \vdots \\ 0 & 0 & \cdots & \cdots & a_{-1} \\ 0 & 0 & \cdots & \cdots & 0 \\ \vdots & \vdots & \ddots & \ddots & \vdots \\ 0 & 0 & \cdots & 0 & 0 \end{bmatrix} + \begin{bmatrix} 0 & 0 & \cdots & \cdots & 0 \\ \vdots & \vdots & \ddots & \ddots & \vdots \\ 0 & 0 & \cdots & \cdots & 0 \\ b_1 & 0 & \cdots & \cdots & 0 \\ \vdots & \vdots & \ddots & \ddots & \vdots \\ b_{L-1} & b_{L-2} & \cdots & b_0 & 0 \end{bmatrix},$$

and correspondingly, $\vec{r} = T\vec{h} + U_1\vec{h} + U_2\vec{h} + \vec{n}$. The first update unit can determine the data $U_1\vec{h}$ the previous data symbol block of the training sequence based on the previous channel estimation, so that the first update unit counteracts $U_1\vec{h}$ from the receiving signal vector, and the updated receiving signal vector is:

$$\vec{r}' = \vec{r} - U_1\vec{h} = T\vec{h} + U_2\vec{h} + \vec{n}'.$$

As another exemplary manner, the receiving signal update module 16 may also include: a second update unit (not shown), configured to determine the data contained in a previous data symbol block and the data contained in a next data symbol block of the training sequence in the receiving signal vector based on the result of the previous estimation, so as to counteract both the data contained in the previous data symbol block and the data contained in the next data symbol block of the training sequence in the receiving signal vector, thereby updating the receiving signal vector.

For example, for the receiving signal vector $\vec{r} = T\vec{h} + U_1\vec{h} + U_2\vec{h} + \vec{n}$, as the second update unit can determine the data $U_1\vec{h}$ in the previous data symbol block and the data $U_2\vec{h}$ in the next symbol block of the training sequence based on the result of the previous estimation, the second update unit can remove both $U_1\vec{h}$ and $U_2\vec{h}$ from the receiving signal vector, and the updated receiving signal vector is:

$$\vec{r}'' = \vec{r} - U_1\vec{h} - U_2\vec{h} = T\vec{h} + \vec{n}'.$$

Next, the recalculation module 18 recalculates the algorithm initial vector based on the training sequence vector and the updated receiving signal vector.

As an exemplary manner, the recalculation module 18 may include a first calculation subunit (not shown), which is configured to recalculate the algorithm initial vector based on the updated receiving signal vector $\vec{r}'$ and the training sequence vector T.

For example, for the receiving signal with the expression: $\vec{r}' = T\vec{h} + U_2\vec{h} + \vec{n}'$, if the estimation is performed based on the LS criterion, the acquired channel estimation expression is:

$$\vec{h} = S\vec{r} = \underbrace{(T'T + \rho D)^{-1}}_{R^{-1}} \underbrace{T'\vec{r}'}_{\vec{p}},$$

D=diag{[L−1 L−2 ... 10]}. Therefore, based on the expression:

$$\vec{\hat{h}} = S\vec{r} = \underbrace{(T'T + \rho D)^{-1}}_{R^{-1}} \underbrace{T'\vec{r}'}_{\vec{p}},$$

the first calculation subunit can recalculate the algorithm initial vectors R and $\vec{p}$ according to the following formulas:

$$R=T'T+\rho D, \vec{p}=T'\vec{r}'.$$

As an exemplary manner, the recalculation module 17 may also include a second calculation unit (not shown), which is configured to recalculate the algorithm initial vector based on the updated receiving signal vector $\vec{r}''$ and the training sequence vector T. For example, for the receiving signal with the expression: $\vec{r}''=T\vec{h}+\vec{n}'$, if the estimation is performed based on the LS criterion, the acquired channel estimation expression is:

$$\vec{\hat{h}} = S\vec{r} = \underbrace{(T'T)^{-1}}_{R^{-1}} \underbrace{T'\vec{r}''}_{\vec{p}}.$$

Therefore, based on the expression:

$$\vec{\hat{h}} = S\vec{r}'',$$

the second calculation unit can recalculate the algorithm initial vectors R and $\vec{p}$ according to the following formulas:

$$R=T'T, \vec{p}=T'\vec{r}''.$$

Persons skilled in the art should understand that, the method that the recalculation module 18 recalculates the algorithm initial vectors R and $\vec{p}$ is only exemplary rather than to limit the present invention. In fact, when other criteria are used, for example, the MMSE criterion is used to perform channel estimation on the receiving signal vector $\vec{r}'$ or $\vec{r}''$, the acquired channel estimation expression is also different, and correspondingly, the method that the recalculation module 18 calculates the algorithm initial vectors R and $\vec{p}$ is adjusted accordingly based on the channel estimation expression, and the detailed description of which is no longer repeated here.

Next, the channel estimation module 13 performs estimation again based on the updated initial channel vector and the recalculated algorithm initial vector and using a conjugate gradient method based on a preprocessing matrix to acquire each channel estimation value. For example, the channel estimation module 13 performs estimation again based on the updated initial channel vector $$f(\gamma\vec{\hat{h}})$$

and the recalculated algorithm initial vectors R=T'T+ρD and $\vec{p}=T'\vec{r}'$ and using a conjugate gradient method based on a preprocessing matrix to acquire each channel estimation value. Further, for example, the channel estimation module 13 performs estimation again based on the updated initial channel vector $$f(\gamma\vec{\hat{h}})$$

and the recalculated algorithm initial vectors R=T'T and $\vec{p}=T'\vec{r}''$ and using a conjugate gradient method based on the preprocessing matrix to acquire each channel estimation value. The estimation process of the channel estimation module can be referred to the embodiment shown in FIG. 7, the detailed description of which is no longer repeated here.

Next, the work process of the noise reduction processing module 14 is already described in detail in the embodiment shown in FIG. 7, which is included here in the manner of reference, and the description is no longer repeated here.

It should be noted that, the work sequence of the channel initial value update module, the receiving signal update module, and the recalculation module is not limited to the above. For example, the channel initial value update module and the receiving signal update module can work at the same time.

Furthermore, the work processes of the channel initial value update module, the receiving signal update module, the recalculation module, and the channel estimation module can be performed repeatedly. For example, after the channel estimation module performs the channel estimation for the second time, the channel initial value update module updates the initial channel vector again, the receiving signal update module and the recalculation module work again to provide the recalculated algorithm initial vector, and the channel estimation module then performs the channel estimation for the third time.

Figure 11:
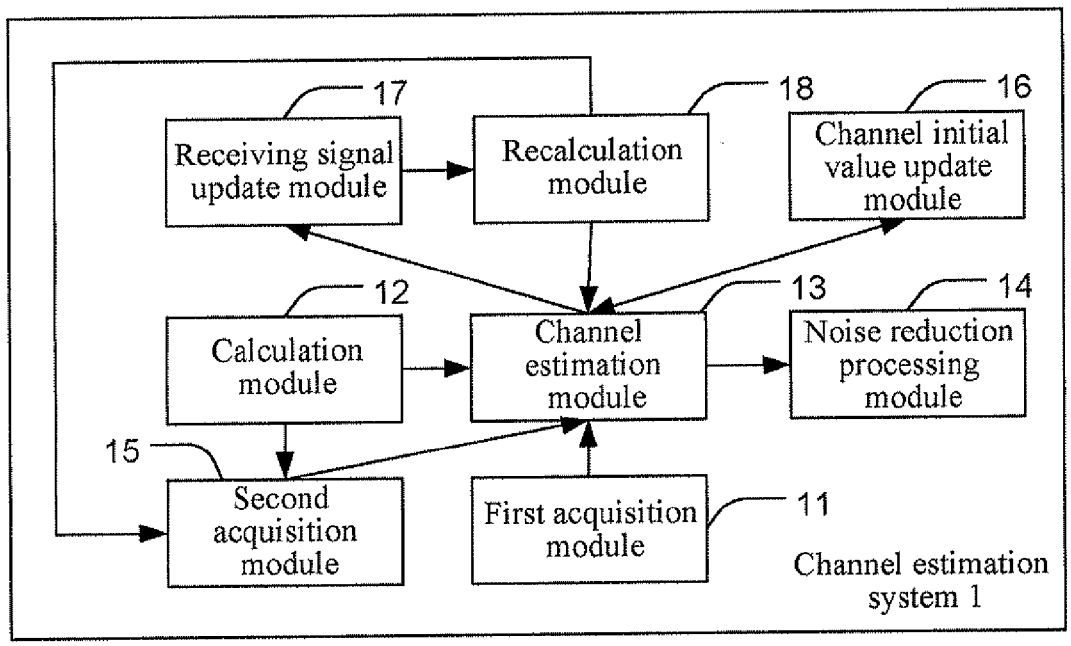
FIG. 11 is a schematic view of a channel estimation system based on a time-domain training sequence according to a further aspect of the present invention.

FIG. 11 is a schematic view of a channel estimation system based on a time-domain training sequence according to a further aspect of the present invention. The channel estimation system includes: a first acquisition module 11, a calculation module 12, a second acquisition module 15, a channel estimation module 13, a channel initial value update module 16, a receiving signal update module 17, a recalculation module 18, and a noise reduction processing module 14.

Specifically, the work processes of the first acquisition module and the calculation module 12 are already described in detail in the embodiment shown in FIG. 7, which are included here in the manner of reference, and the description is no longer repeated. The process that the second acquisition module 15 acquires the preprocessing matrix based on the algorithm initial vector provided by the first acquisition module 11 is already described in detail in the embodiment shown in FIG. 8, which is also included here in the manner of reference, and the description is no longer repeated. The process that the channel estimation module 13 performs channel estimation based on the algorithm initial vector provided by the first acquisition module 11 and the preprocessing matrix provided by the second acquisition module 15 as well as the work processes of the channel initial value update module 16, the receiving signal update module 17, and the recalculation module 18 are all described in detail in the embodiment shown in FIG. 10 already, which are included here in the manner of reference, and the description is no longer repeated.

Next, the second acquisition module 15 acquires the preprocessing matrix again based on the recalculated algorithm initial vector. For example, the second acquisition module 15 processes the 0 matrix of the (L+1)*(L+1) based on the recalculated algorithm initial vector according to the method in the embodiment shown in FIG. 8 again to acquire the preprocessing matrix again.

Next, the channel processing module 13 performs channel estimation based on the updated initial channel vector, the recalculated algorithm initial vector, and the preprocessing matrix acquired again and using a conjugate gradient method based on a preprocessing matrix to acquire each channel estimation value. The specific process can be referred to the embodiment shown in FIG. 8, the detailed description of which is no longer repeated here.

In the end, the noise reduction processing module 14 is already described in detail in the embodiment shown in FIG. 7, and the description is no longer repeated here.

Similarly, the work sequence of the initial channel vector update module, the receiving signal update module, and the recalculation module is not limited to the above. For example, the initial channel vector update module and the receiving signal update module can work at the same time.

Furthermore, the work processes of the initial channel vector update module, the receiving signal update module, the recalculation module, and the channel estimation module can be performed repeatedly. For example, the channel estimation module performs channel estimation for the second time, the initial channel vector update module updates the initial channel vector again, the receiving signal update module and the recalculation module work again to provide the recalculated algorithm initial vector, and then the channel estimation module performs channel estimation for the third time.

In conclusion, in the channel estimation method and system based on a time-domain training sequence of the present invention, when a conjugate gradient method based on a preprocessing matrix is used to calculate a channel estimation value, the channel estimation value can be acquired by simply calculating an algorithm initial vector according to a training sequence and performing iteration based on a channel initial value and the algorithm initial vector. In Jin H. Kim's solution (referring to the US Patent Document with the Application No. 729722), the information of the decoding feedback needs to be used as a training sequence and Fast Fourier Transform (FFT) is required to update conjugate gradient. Therefore, compared with Jin H. Kim's solution, the present invention has apparently simpler operations and a shorter delay, and thus can be easily implemented.

The above embodiments only exemplarily illustrate the principles and efficacies of the present invention rather than to limit the present invention. Any person skilled in the art can make modifications to the above embodiments without departing from the spirit and scope of the present invention. Therefore, the protection scope of the present invention shall be as defined by the claims.

What is claimed is:

1. A channel estimation method based on a time-domain training sequence at a signal receiving end of a terrestrial digital broadcast system, comprising:
   x. acquiring a first initial channel vector from a receiving signal vector received by the signal receiving end, the first initial channel vector used for channel estimation of a current frame of the received receiving signal vector;
   y. calculating a second initial channel vector and a third initial channel vector, the second initial channel vector being calculated using a training sequence vector contained in the receiving signal vector and a transposed training sequence vector that is a transpose of the training sequence vector, and the third initial channel vector being calculated using the transposed training sequence vector and the receiving signal vector;
   a. performing channel estimation of acquiring each channel estimation value by a conjugate gradient method, the conjugate gradient method using the first initial channel vector, the second initial channel vector, the third initial channel vector, and a preprocessing matrix; and
   b. performing noise reduction processing on each channel estimation value to acquire a final channel estimation value based on a first predetermined threshold value.

2. The channel estimation method based on a time-domain training sequence at a signal receiving end of a terrestrial digital broadcast system according to claim 1, further comprising:
   based on a second predetermined threshold value, performing noise reduction on each previous channel estimation value to update the initial channel vector, and repeating Step a based on the updated initial channel vector.

3. The channel estimation method based on a time-domain training sequence at a signal receiving end of a terrestrial digital broadcast system according to claim 2, further comprising:
   z1. based on a result of the previous estimation, updating the receiving signal vector; and
   z2. based on the training sequence vector and the updated receiving signal vector, recalculating the algorithm initial vector, and repeating Step a based on the recalculated algorithm initial vector.

4. The channel estimation method based on a time-domain training sequence at a signal receiving end of a terrestrial digital broadcast system according to claim 3, wherein Step z1 further comprises:
   based on the result of previous estimation, determining data of a previous data symbol block of a training sequence in the receiving signal vector to update the receiving signal vector.

5. The channel estimation method based on a time-domain training sequence at a signal receiving end of a terrestrial digital broadcast system according to claim 3, wherein Step z1 further comprises:
   based on a result of previous estimation, determining data of a previous data symbol block and data of a next data symbol block of a training sequence in the receiving signal vector to update the receiving signal vector.

6. The channel estimation method based on a time-domain training sequence at a signal receiving end of a terrestrial digital broadcast system according to claim 1, further comprising:
   m. based on the algorithm initial vector, acquiring the preprocessing matrix.

7. The channel estimation method based on a time-domain training sequence at a signal receiving end of a terrestrial digital broadcast system according to claim 6, wherein when channel estimation is based on least-square (LS), Step a further comprises:
   based on an initial channel vector $\vec{h}_0$, algorithm initial vectors R and $\vec{p}$, and a preprocessing matrix M, calculating iterative initial values $\vec{p}_1$ and $\rho_0$ according to the following formulas:

$$\vec{r}_0 = \vec{p} - R\vec{h}_0, \ \vec{z}_0 = M^{-1}\vec{r}_0, \ \vec{p}_1 = \vec{z}_0, \ \rho_0 \vec{r}_0^T \vec{z}_0;$$

based on the iterative initial values and $\vec{p}_0$ and $\rho_0$ the preprocessing matrix M, performing iterative calculation N times to acquire each channel estimation value $\vec{h}_N$, wherein iterative calculation of the kth time is:

$\vec{w}=R\vec{p}_k$, $\vec{a}_k=\vec{p}_{k-1}/\vec{p}_k^T\vec{w}$, $\vec{h}_k=\vec{h}_{k-1}+\vec{a}_k\vec{p}_k$, $\vec{r}_k=\vec{r}_{k-1}-\vec{a}_k\vec{w}$ $\vec{z}_k=M^{-1}\vec{r}_k$, $\rho_k=\vec{r}_k^T\vec{z}_k$, $\beta_k=\rho_k/\rho_{k-1}$, $\vec{p}_{k+1}=\vec{z}_k+\beta_k\circ\vec{p}_k$ $\vec{p}_k^T$ is a conjugate matrix of $\vec{p}_k$, $\vec{r}_k^T$ is a conjugate matrix $\vec{r}_k\vec{p}_k$, $\rho_k/\rho_{k-1}$ is division of corresponding elements in $\rho_k$ and $\rho_{k-1}$, and $\beta_k\circ\vec{p}_k$ is multiplication of corresponding elements in $\beta_k$ and $\vec{p}_k$.

8. The channel estimation method based on a time-domain training sequence at a signal receiving end of a terrestrial digital broadcast system according to claim 7, wherein Step z1 comprises:

based on a training sequence vector T and an updated receiving signal vector $\vec{r}'''$, recalculating algorithm initial vectors R and $\vec{p}$ according to the following formulas:

$R=T'T, \vec{p}=T'\vec{r}'''$.

9. The channel estimation method based on a time-domain training sequence at a signal receiving end of a terrestrial digital broadcast system according to claim 7, wherein Step z1 comprises:

based on a training sequence vector T and an updated receiving signal vector $\vec{r}'$, recalculating algorithm initial vectors R and $\vec{p}$ according to the following formulas:

$R=T'T+\rho D$, $\vec{p}=T'\vec{r}'$ in which T' is transposition of T, $\rho$ is a predetermined value, $D=\text{diag}\{[L-1\ L-2\ \ldots\ 10]\}$, and L is the length of a training sequence.

10. The channel estimation method based on a time-domain training sequence at a signal receiving end of a terrestrial digital broadcast system according to claim 7, wherein Step m further comprises:

based on an algorithm initial vector R, processing 0 matrix of $(L+1)*(L+1)$ in the following manner to acquire a preprocessing matrix:

$i=0, 1, \ldots L$, when $i<d$, $M(i,i)=R(i,i);M(i,i+d)=R(i,i+d)$;

otherwise, when $i<=L-d$, $M(i,i)=R(i,i);M(i,i+d)=R(i,i+d);(i,i-d)=R(i,i-d)$;

in other cases, $M(i,i)=R(i,i)$, $M(i,i-d)=R(i,i-d)$;

in which L is the length of a training sequence, d is the length of the complete sequence after a cyclic prefix is removed from the training sequence, and R(i,i) is a value of ith row and ith column in the algorithm initial vector R.

11. The channel estimation method based on a time-domain training sequence at a signal receiving end of a terrestrial digital broadcast system according to claim 7, wherein Step y comprises:

based on a training sequence vector T and a received receiving signal vector $\vec{r}$, calculating the algorithm initial vectors R and $\vec{p}$ according to the following formulas:

$R=T'T+\rho I_{(L+1)}L$, $\vec{p}=T'\vec{r}$, in which $\rho$ is a predetermined value, L is the length of a training sequence, T' is transposition of T, and $I_{(L+1)}$ is a unit matrix of a (L+1) dimension.

12. The channel estimation method based on a time-domain training sequence at a signal receiving end of a terrestrial digital broadcast system according to claim 1, wherein Step x comprises:

based on a channel estimation result of a previous frame, acquiring the initial channel vector.

13. The channel estimation method based on a time-domain training sequence at a signal receiving end of a terrestrial digital broadcast system according to claim 1, wherein Step x comprises:

correlating the training sequence vector contained in the receiving signal vector and a prestored training sequence to acquire the initial channel vector.

14. A channel estimation system based on a time-domain training sequence, comprising:

a first acquisition module, configured to acquire a first initial channel vector from a receiving signal vector received by the signal receiving end, the first initial channel vector used for channel estimation of a current frame;

a calculation module, configured to estimate a second initial channel vector and a third initial channel vector, the second initial channel vector being estimated using a training sequence vector contained in the receiving signal vector and a transposed training sequence vector that is a transpose of the training sequence vector, and the third initial channel vector being estimated using the transposed training sequence vector and the receiving signal vector;

a channel estimation module, configured to perform channel estimation to acquire each channel estimation value by a conjugate gradient method using the first initial channel vector, the second initial channel vector, the third initial channel vector, and a preprocessing matrix; and a noise reduction processing module, configured to perform noise reduction processing on each channel estimation value to acquire a final channel estimation value based on a first predetermined threshold value.

15. The channel estimation system based on a time-domain training sequence according to claim 14, further comprising: an initial channel vector update module, configured to, based on a second predetermined threshold value, perform noise reduction on each previous channel estimation value to update an initial channel vector, so that the channel estimation module performs channel estimation again.

16. The channel estimation system based on a time-domain training sequence according to claim 15, further comprising: a receiving signal update module, configured to, based on a result of the previous estimation, update the receiving signal vector; a recalculation module, configured to, based on the training sequence vector and the updated receiving signal vector, recalculate the initial vector for an gradient algorithm, so that the channel estimation module performs channel estimation again.

17. The channel estimation system based on a time-domain training sequence according to claim 16, wherein the receiving signal update module further comprises:

a first update unit, configured to, based on the result of the previous estimation, determine data of a previous data symbol block of a training sequence in the receiving signal vector to update the receiving signal vector.

18. The channel estimation system based on a time-domain training sequence according to claim 16, wherein the receiving signal update module further comprises:
   a second update unit, configured to, based on the result of the previous estimation, determine data of a previous data symbol block and data of a next data symbol block of a training sequence in the receiving signal vector to update the receiving signal vector.

19. The channel estimation system based on a time-domain training sequence according to claim 14 wherein the channel estimation system further comprises:
   a second acquisition module, configured to acquire a preprocessing matrix; and
   the channel estimation module is further configured to:
   based on the initial channel vector, the algorithm initial vector, and the preprocessing matrix and using a conjugate gradient method based on a preprocessing matrix, perform channel estimation to acquire each channel estimation value.

20. The channel estimation system based on a time-domain training sequence according to claim 19, wherein when the channel estimation is based on least-square (LS), the channel estimation module further comprises:
   an iterative initial value calculation unit, configured to, based on a channel initial amount $\vec{h}_0$, algorithm initial vectors R and $\vec{p}$, and a preprocessing matrix M, calculate iterative initial values $\vec{p}_1$ and $\rho_0$ according to the following formulas:

$$\vec{r}_0 = \vec{p} - R\vec{h}_0,\ \vec{z}_0 = M^{-1}\vec{r}_0,\ \vec{p}_1 = \vec{z}_0,\ \rho_0 = \vec{r}_0^T \vec{z}_0;$$

an iteration unit, configured to, based on the iterative initial values $\vec{p}_1$ and $\rho_0$ and the preprocessing matrix M, perform iterative calculation for N times to acquire each channel estimation value $\vec{h}_N$, and, iterative calculation of the kth time is:

$$\vec{w} = R\vec{p}_k,\ a_k = \vec{p}_{k-1}/\vec{p}_k^T \vec{w},$$

$$\vec{h}_k = \vec{h}_{k-1} + a_k \vec{p}_k,\ \vec{r}_k = \vec{r}_{k-1} - a_k \vec{w},$$

$$\vec{z}_k = M^{-1}\vec{r}_k,\ \rho_k = \vec{r}_k^T \vec{z}_k,$$

$$\beta_k = \rho_k/\rho_{k-1},\ \vec{p}_{k+1} = \vec{z}_k + \beta_k \circ \vec{p}_k$$

$\vec{p}_k^T$ is a conjugate matrix of $\vec{p}_k$, $\vec{r}_k^T$ is a conjugate matrix of $\vec{r}_k$, $\vec{p}_k$, $\rho_k/\rho_{k-1}$ is division of corresponding elements in $\rho_k$ and $\rho_{k-1}$, and $\beta_k \circ \vec{p}_k$ is multiplication of corresponding elements in $\beta_k$ and $\vec{p}_k$.

21. The channel estimation system based on a time-domain training sequence according to claim 20, wherein the recalculation module further comprises:
   a first calculation unit, configured to, based on a training sequence vector T and an updated receiving signal vector $\vec{r}'$, recalculate the algorithm initial vectors R and $\vec{p}$ according to the following formulas:

$$R = T'T + \rho D,\ \vec{p} = T'\vec{r}',$$

in which T' is the transposition of T, $\rho$ is a predetermined value, D=diag{[L−1 L−2 ... 10]}, and L is the length of a training sequence.

22. The channel estimation system based on a time-domain training sequence according to claim 20, wherein the recalculation unit further comprises:
   a second calculation subunit, configured to, based on a training sequence vector T and an updated receiving signal vector $\vec{r}''$, recalculating the algorithm initial vector R and $\vec{p}$ according to the following formulas:

$$R = T'T,\ \vec{p} = T'\vec{r}''.$$

23. The channel estimation system based on a time-domain training sequence according to claim 20, wherein the second acquisition module further comprises:
   a first acquisition subunit, configured to, based on the algorithm initial vector R, process 0 matrix of (L+1)*(L+1) in the following manner to acquire a preprocessing matrix:

$i = 0, 1, \ldots L,$ when $i < d$, $M(i,i) = R(i,i); M(i,i+d) = R(i,i+d);$ otherwise, when $i <= L-d$, $M(i,i) = R(i,i); M(i,i+d) = R(i,i+d); (i,i-d) = R(i,i-d);$ in other cases, $M(i,i) = R(i,i); M(i,i-d) = R(i,i-d);$ in which L is the length of a training sequence, d is the length of the complete sequence after a cyclic prefix is removed from the training sequence, and R(i,i) is a value of the ith row and ith column in the algorithm initial vector R.

24. The channel estimation system based on a time-domain training sequence according to claim 19, wherein the calculation module further comprises:
   a third calculation subunit, configured to, based on a training sequence vector T and a received receiving signal vector $\vec{r}$, calculate the algorithm initial vectors R and $\vec{p}$ according to the following formulas:

$$R = T'T + \rho I_{(L+1)}L,\ \vec{p} = T'\vec{r},$$

in which, $\rho$ is a predetermined value, L is the length of a training sequence, T' is transposition of T, and $I_{(L-1)}$ is a unit matrix of a (L+1) dimension.

25. The channel estimation system based on a time-domain training sequence according to claim 14, wherein the first acquisition module further comprises:
   a second calculation subunit, configured to acquire the initial channel vector based on a channel estimation result of a previous frame.

26. The channel estimation system based on a time-domain training sequence according to claim 14, wherein the first calculation module further comprises:
   a fourth calculation subunit, configured to correlate the training sequence vector contained in the receiving signal vector and a prestored training sequence to calculate the initial channel vector.

* * * * *